(12) United States Patent
Mao et al.

(10) Patent No.: US 9,756,102 B2
(45) Date of Patent: Sep. 5, 2017

(54) REQUEST CANCELLATION METHOD FOR MEDIA STREAMING

(71) Applicant: QUALCOMM Incorporated, San Diego, CA (US)

(72) Inventors: Yinian Mao, San Diego, CA (US); Fatih Ulupinar, San Diego, CA (US); Arvind Subramanian Krishna, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 14/047,061

(22) Filed: Oct. 7, 2013

(65) Prior Publication Data

US 2015/0100701 A1    Apr. 9, 2015

(51) Int. Cl.
G06F 15/16 (2006.01)
H04L 29/06 (2006.01)

(52) U.S. Cl.
CPC .......... H04L 65/60 (2013.01); H04L 65/1069 (2013.01); H04L 65/4084 (2013.01); H04L 65/4092 (2013.01); H04L 65/607 (2013.01); H04L 65/80 (2013.01)

(58) Field of Classification Search
CPC .......... H04L 65/60; H04L 12/56; H04L 47/76
USPC .......................................................... 709/231
See application file for complete search history.

(56) References Cited

U.S. PATENT DOCUMENTS 8,024,483 B1 * 9/2011 Rothstein ................ H04W 4/18
709/224

2004/0199653 A1 * 10/2004 Amini ............... H04L 29/06027
709/231
2006/0215676 A1 * 9/2006 Ratakonda .......... H04L 12/5693
370/412

(Continued)

FOREIGN PATENT DOCUMENTS

EP         2360923 A1    8/2011
WO    2012167106 A1    12/2012
WO    2013090280 A2    6/2013

OTHER PUBLICATIONS

International Search Report and Written Opinion—PCT/US2014/059365—ISA/EPO—dated Jan. 15, 2015.

*Primary Examiner* — Nicholas Taylor
*Assistant Examiner* — Meng Veng
(74) *Attorney, Agent, or Firm* — The Marbury Law Group, PLLC

(57) ABSTRACT

In overview, the various embodiments provide methods implemented by a processor executing a DASH client on a receiver device for determining when, in view of a change in the receiver device's resources (e.g., bandwidth, battery power, etc.), to cancel or abandon downloading the current segment at the current representation and restart download of the current segment at a different representation to meet one or more performance objectives and/or optimizations related to the change in the receiver device's resources. In various embodiments, the receiver device processor may perform a cost-benefit analysis to determine whether switching representations during the ongoing download of the current segment will benefit the performance of the receiver device, and the receiver device processor may switch representations in response to determining that switching representations would improve the performance of the receiver device.

24 Claims, 11 Drawing Sheets

(56) References Cited

U.S. PATENT DOCUMENTS

| | | | |
|---|---|---|---|
| 2007/0283340 A1* | 12/2007 | Thompson | G06F 3/0481 |
| 2009/0307367 A1* | 12/2009 | Gigliotti | G06F 15/16 |
| | | | 709/231 |
| 2011/0161485 A1* | 6/2011 | George | H04L 65/4069 |
| | | | 709/224 |
| 2012/0016965 A1 | 1/2012 | Chen et al. | |
| 2012/0317305 A1 | 12/2012 | Einarsson et al. | |
| 2013/0007223 A1 | 1/2013 | Luby et al. | |
| 2013/0227080 A1 | 8/2013 | Gao et al. | |
| 2013/0329781 A1* | 12/2013 | Su | H04N 21/23424 |
| | | | 375/240.02 |
| 2014/0019633 A1* | 1/2014 | Zhang | H04L 65/608 |
| | | | 709/231 |
| 2014/0108502 A1* | 4/2014 | Lai | H04L 65/4092 |
| | | | 709/203 |

* cited by examiner

REQUEST CANCELLATION METHOD FOR MEDIA STREAMING

BACKGROUND

The Hypertext Transfer Protocol ("HTTP") is currently a popular method of delivering content such as videos, pictures, text, etc. over the Internet. In many current applications, such as streaming video files, content is made available progressively through repeated requests from the receiver device to an HTTP server for sequential segments of the content. The segments' availability follows a timeline that indicates when each successive segment becomes available in the HTTP server.

Dynamic Adaptive Streaming Over Hypertext Transfer Protocol ("DASH") is a standard that implements HTTP streaming. DASH announces the segments' availability in a Media Presentation Description ("MPD") that is sent to the receiver device. The MPD describes the media components associated with a DASH media presentation and declares a segment availability timeline that announces the segments, the times segments are available, and the size of the segments.

Currently, a receiver device may render a stream of content by continually requesting the next segment of content from the content provider while playing the current segment of content. To gather a segment needed to render the content, a DASH enabled application/client running on the receiver device sends an HTTP request to an HTTP server to request the next segment identified in the MPD. The HTTP server responds with the requested segment or responds with an HTTP redirect message indicating another Uniform Resource Locator ("URL") to which the DASH client should send a subsequent HTTP request for the segment.

DASH also allows more than one representation (e.g., video quality version) of each segment to be made available. For example, more than one representation of each segment may be made available by hosting a high bit rate/quality version of a segment on one server (e.g., URL) and a low bit rate/quality version of the same segment on another server. A DASH application/client may then retrieve either the high bit rate/quality version (e.g., when reception bandwidth is high) or the low bit rate/quality version of the segment (e.g., when reception band width is low), and render either version. If the receiver device is experiencing very high bandwidth, it may download both high and low quality representations.

SUMMARY

The various embodiments provide methods implemented by a processor executing a DASH client on a receiver device for determining when, in view of a change in the receiver device's resources (e.g., bandwidth, battery power, etc.), to cancel or abandon downloading the current segment at the current representation and restart download of the current segment at a different representation to meet one or more performance objectives and/or optimizations related to the change in the receiver device's resources. In various embodiments, the receiver device processor may perform a cost-benefit analysis to determine whether switching representations during the ongoing download of the current segment will benefit the performance of the receiver device, and the receiver device processor may switch representations in response to determining that switching representations would improve the performance of the receiver device.

In an embodiment, the receiver device processor may recognize a switching situation has occurred on the receiver device before determining whether to switch representations. In an embodiment, a switching situation may occur when a change in the receiver device's available resources (e.g., bandwidth, battery power, etc.) is affecting or will affect one or more performance objectives during the current segment download, and a switching situation may represent an occasion in which cancelling the download of the current segment at a current representation and restarting the download of a different representation of the current segment may be required to meet one or more performance objectives.

In an embodiment, in response to recognizing a switching situation, the receiver device processor may perform a cost-benefit analysis to determine whether switching representations during the current segment's download would achieve one or more performance objectives or cause a desired performance on the receiver device. In a further embodiment, the receiver device processor may determine or calculate the minimum conditions required to satisfy the one or more performance objectives (e.g., one or more cost thresholds), such as the time needed to abandon an ongoing download of the current segment and the time to download the entire current segment in the new representation from that server.

In another embodiment, the receiver device processor may compare the costs of switching representations to the cost threshold to determine whether switching representations is a desirable strategy to achieve one or more performance objectives, and the receiver device processor may cancel the current segment request and switch to another representation of the current segment only when the receiver device processor determines that the benefits of switching outweigh the costs (e.g., when the calculated costs do not exceed the cost threshold). Otherwise, when the costs exceed the cost threshold, the receiver device processor may take no further action and allow the ongoing download to continue.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
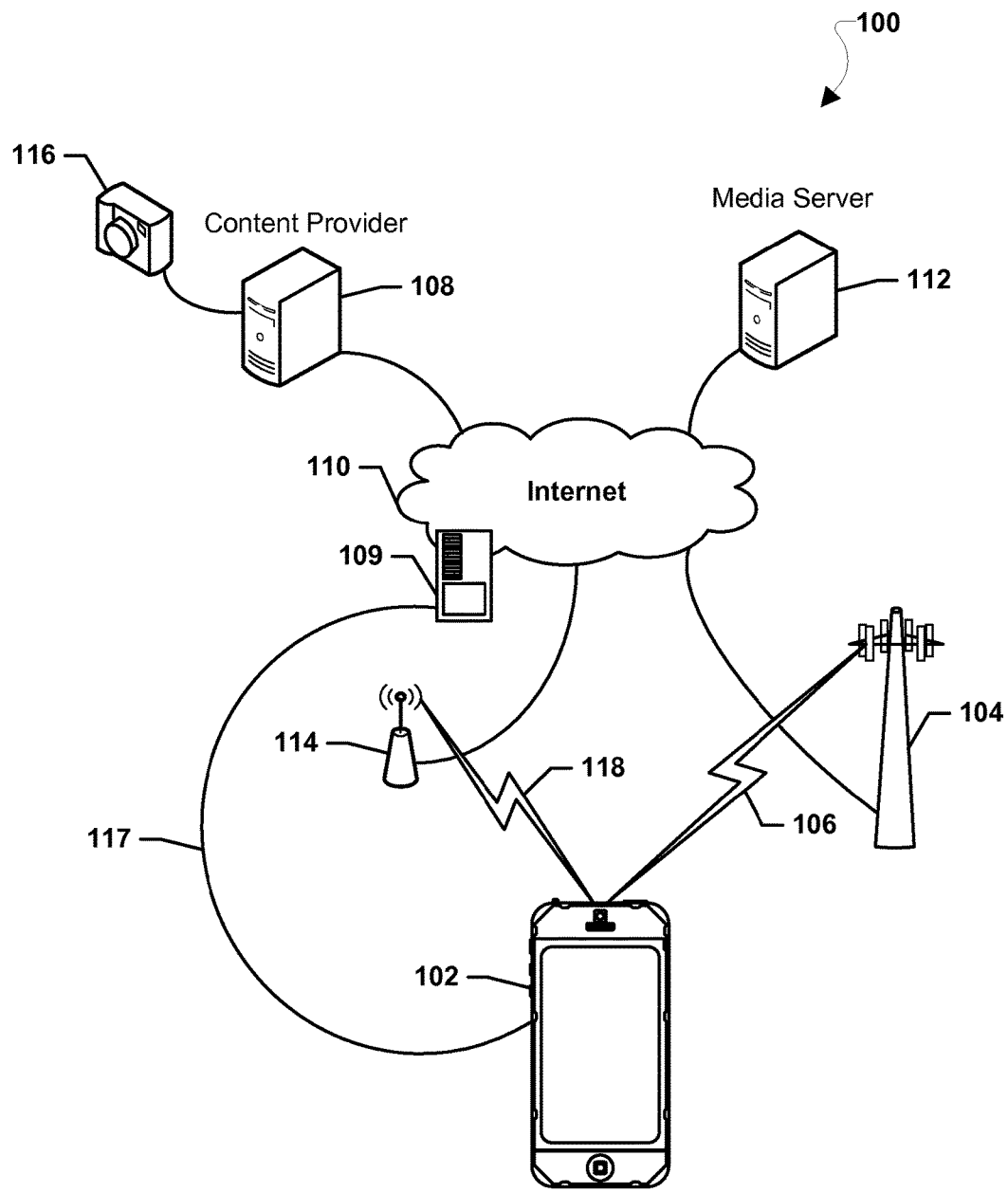
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "receiver device" refers to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for presenting media content.

As used herein, the term "switching representations" refers to the process of cancelling a download of a current segment at a first representation and restarting download of the current segment at a second representation.

Various examples of different applications/clients, middleware, segment availability timelines, radio technologies, and transport protocols are discussed herein, specifically DASH clients, MPDs, and HTTP. The discussions of DASH clients, MPDs, and HTTP are provided merely as examples to better illustrate the aspects of the various embodiments, and are not intended to limit the various embodiments in any way. Other applications/clients, middleware, segment availability timelines, radio technologies, and transport protocols may be used with the various embodiments, and the other applications/clients, middleware, segment availability timelines, radio technologies, and transport protocols may be substituted in the various examples without departing from the spirit or scope of the invention.

A DASH client typically deals with three different segments at a time: the segment being played out from the playback buffer, the segment that is currently downloading from an HTTP server; and the next segment to be requested for download. As used herein, the term "current segment" refers to the segment that is currently downloading and being stored in the playback buffer. Typically, the current download segment will be played later, such as the next segment that is played or a segment that is played sometime later. In receiver devices with media applications systems that support playout of partially downloaded segments, the current segment (i.e., the segment being downloaded and stored) may begin to be played before the download has completed as the media segment may begin accessing already downloaded portions of the segment from the playback buffer at the same time that the rest of segment is being received and stored.

While streaming content (e.g., videos), a receiver device may experience fluctuations in available bandwidth for various reasons. A DASH client running on the receiver device typically handles bandwidth variations by selecting a representation of the next segment for download from among the different representations of streaming content based on the current available bandwidth when the DASH client requests the next segment of streaming content. For example, the client device may request a lower bit rate version of the next segment of the streaming content in response to recognizing a drop in available bandwidth. This selection of the appropriate version of each segment may be based upon the time it will take to download the segment compared to the time remaining before that segment begins to play (or remaining play time of the playing segment), while the time to download each segment may be estimated based on the amount of data to be downloaded in the segment divided by the estimated bit rate supported by the current bandwidth. Thus, a DASH client presently can only change the bit rate representation for the next segment of content. As described herein, the process of selecting another representation for the next segment to be downloaded is termed the "main rate selection algorithm."

Occasionally, while the DASH client is downloading a current segment at a certain bit rate, the available bandwidth drops significantly such that the full download of the current segment cannot be accomplished before the current segment is scheduled to begin playing. When this happens, the result will be a stall of the video playout as the current segment will not be downloaded in time given the drop in bandwidth. In current implementations, a DASH client can predict when a stall in playback is likely to occur based on an estimate of the current bandwidth (download bit rate), the amount of data of the current segment yet to be received from the HTTP server, and the time remaining before the current segment is scheduled to begin. However, the DASH client can only resolve playback issues through the main rate selection algorithm as described above. Therefore, even though the DASH client may eventually resolve playback stalls by switching to a representation with a lower bit rate, by that point, the user may have already experienced a drop in performance (e.g., a playback stall). Thus, a user may benefit from a method of dealing with sudden drops in bandwidth that occur during the current segment download.

In overview, the various embodiments provide methods implemented by a processor executing a DASH client on a receiver device for determining when, in view of a change in the receiver device's resources (e.g., bandwidth, battery power, etc.), to cancel or abandon downloading the current segment at the current representation and restart download of the current segment at a different representation to meet one or more performance objectives and/or optimizations related to the change in the receiver device's resources. In various embodiments, the receiver device processor may perform a cost-benefit analysis to determine whether switching representations during the ongoing download of the current segment will benefit the performance of the receiver device, and the receiver device processor may switch representations in response to determining that switching representations would improve the performance of the receiver device.

In an embodiment, the receiver device processor may recognize a switching situation has occurred on the receiver device before determining whether to switch representations. In an embodiment, a switching situation may occur when a change in the receiver device's available resources (e.g., bandwidth, battery power, etc.) is affecting or will affect one or more performance objectives during the current segment download. Example performance objectives include maintaining a certain power consumption rate, ensuring a target bit rate for playout, limiting data usage, and ensuring a smooth playout (e.g., avoiding a playout stall). Specifically, a switching situation may represent an occasion in which cancelling the download of the current segment at a current representation and restarting the download of a different representation of the current segment may be required to meet one or more performance objectives. For example, a switching situation may occur when the receiver device processor recognizes that a sudden drop in bandwidth will cause a playout stall because the lower bandwidth will prevent the receiver device from completing the download of the current segment with the current bit rate representation before the current segment is scheduled for playout.

In an embodiment, in response to recognizing a switching situation, the receiver device processor may perform a cost-benefit analysis to determine whether switching representations during the current segment's download would achieve one or more performance objectives or cause a desired performance on the receiver device. In a further embodiment, the receiver device processor may determine or calculate the minimum conditions required to satisfy the one or more performance objectives (e.g., a cost threshold). For example, a cost threshold to achieve smooth playback may be in terms of the amount of time before a playout stall occurs, and satisfying the smooth playback objective of preventing playout stalls requires that the time needed to switch representations does not exceed the time before the playout stall is expected to occur. In the following description and in the claims, references to "costs" are intended to encompass a variety of factors that are not financial in nature, including battery power consumption and time to accomplish various tasks as described below.

In an embodiment, the receiver device processor may calculate various costs associated with switching representations based on the one or more performance objectives to be satisfied. In an example in which the performance objective is ensuring smooth playout, the receiver device processor may calculate the costs associated with switching representations in terms of the time required to switch representations, such as the time needed to abandon the ongoing download of the current segment (which may involve closing a TCP/IP connection and opening a new connection), the time needed to communicate the request to an HTTP server for another representation, and the time to download the entire current segment in the new representation from that server. In various embodiments, the receiver device processor may also or alternatively determine the costs in terms of the power needed to switch representations, the effect on the average bit rate of the playout, or impacts on various other performance objectives or optimizations.

In another embodiment, the receiver device processor may compare the costs of switching representations to the predetermined cost threshold to determine whether switching representations is a desirable strategy to achieve one or more performance objectives. The receiver device processor may perform the cost-benefit analysis before switching representations because switching representations every time a switching situation is detected may result in a worse user experience than taking no action in many instances. Thus, the receiver device processor may cancel the current segment request and switch to another representation of the current segment only when the receiver device processor determines that the benefits of switching outweigh the costs (e.g., when the calculated costs do not exceed the cost threshold). Otherwise, when the costs exceed the cost threshold, the receiver device processor may take no further action and may operate normally, such as by performing the main rate selection algorithm as described above.

In further embodiments, the receiver device processor may switch representations without interfering with the receiver device processor's ability to perform the main rate selection algorithm. In an embodiment, the receiver device processor may use the same information sources when determining whether to switch representations during the current segment download as when performing the main rate selection algorithm. The embodiment may avoid "ping-pong" situations in which the receiver device processor switches representations during the download of a current segment and then switches back while performing the main rate selection algorithm to select the next segment.

FIG. 1 illustrates a communication network system 100 suitable for use with the various embodiments. The communication network system 100 may include multiple devices, such as a receiver device 102, one or more cellular towers or base stations 104, one or more wireless access point 114, one or more routers 109, and servers 108 and 112 connected to the Internet 110. The receiver device 102 may exchange data via one or more cellular connections 106, including CDMA, TDMA, GSM, PCS, 3G, 4G, LTE, or any other type of connection, with the cellular tower or base station 104. The cellular tower or base station 104 may be in communication with a router (not shown) which may connect to the Internet 110. The receiver device 102 may exchange data via one or more connections 118, including Wi-Fi® or any other type connection, with the wireless access point 114. The wireless access point 114 may be in communication with a router (not shown) which may connect to the Internet 110. The receiver device 102 may exchange data via one or more wired connections 117 with the router 109 which may connect to the Internet 110. In this manner, via the connections to the cellular tower or base station 104, wireless access point 114, router 109, and/or Internet 110, data may be exchanged between the receiver device 102 and the server(s) 108 and 112. In an embodiment, server 108 may be a content provider server and/or encoder providing media for output via a DASH client. In an embodiment, the server 108 may receive the media from a media capture device 116, such as a camera. In an embodiment, server 112 may be a media server that may receive media output from a content server or encoder and control the provisioning of media to the receiver device 102.

Figure 2:
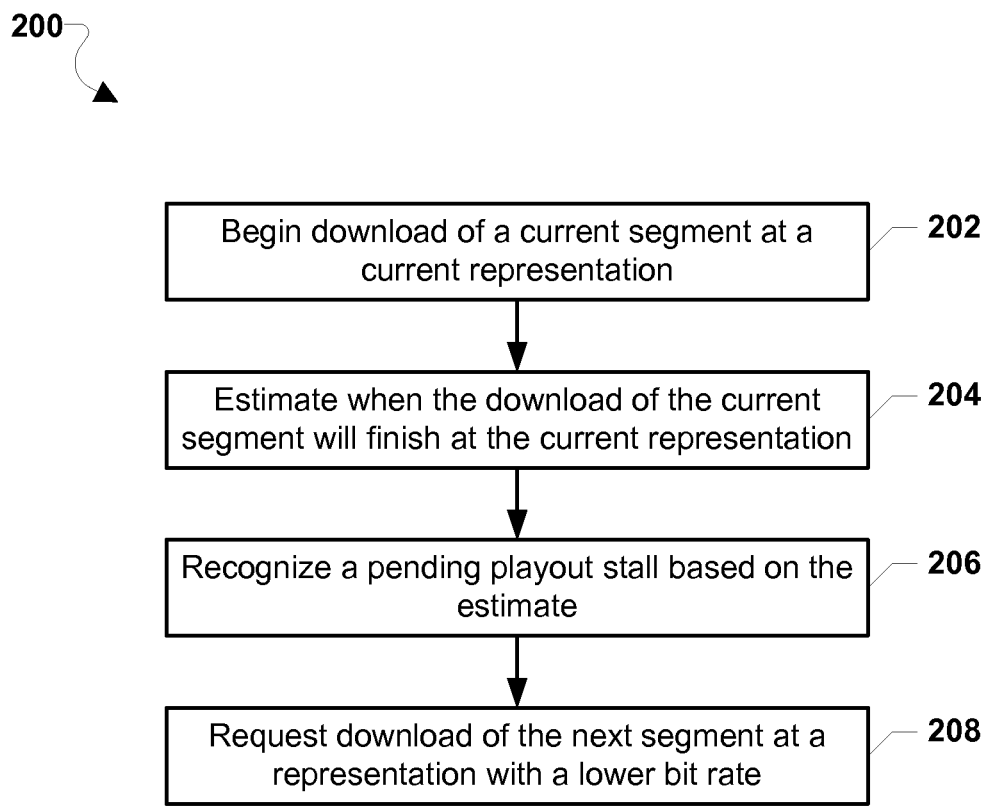
FIG. 2 is a process flow diagram illustrating a typical method for request download of a next segment at a representation with a lower bit rate in response to recognizing a pending playout stall.

FIG. 2 illustrates a conventional method 200 that may be implemented by a processor executing the DASH client on a receiver device for downloading a next segment at a different representation when a playout stall is detected. The operations of method 200 illustrate operations of a main rate selection algorithm as currently practiced.

In block 202, the receiver device processor may begin downloading a current segment at a current representation. For example, the receiver device processor may reference an MPD received from an HTTP server to determine when and at what URL/address a particular media segment will be available for downloading. After determining the location (e.g., a URL indicating the media segment's location), the receiver device processor may send an HTTP request for the particular media segment at a given representation (e.g., 512 kbit). The receiver device processor may then begin receiving data packets for the particular media segment (e.g., the current segment) from the HTTP server.

In block 204, the receiver device processor may estimate when the download of the current segment will finish at the current representation. The receiver device processor may gather information regarding various aspects of the current segment's download. For example, the receiver device processor may determine the start and end time of the current segment download and the nominal representation bit-rate of the current segment from the MPD. The receiver device processor may also determine the estimated round-trip time (e.g., RTT) between the receiver device and the HTTP server. The receiver device processor may also determine the bandwidth-delay product, which may be calculated as the product of the current estimated bandwidth and the round-trip time. The receiver device processor may also determine the aggregate of all receiver-buffer sizes from every active TCP connection (e.g., an active TCP connection being considered to have an ongoing data transfer). The receiver device processor may also determine the current playback time of the media presentation, the number of bytes in the current segment that has already been downloaded, and the relative weight of the adaptation set to which the current segment belongs (e.g., a value between 0 and 1).

Thus, the receiver device processor may use information obtained on the receiver device (e.g., such as the information described above) to estimate when the current segment will finish downloading.

In block 206, the receiver device processor may recognize a pending playout stall based on the estimate. When predicting the tendency to stall, a segment may be able to begin playing when partially downloaded, and no stall may occur as long as the segment will be completely downloaded before the playback reaches the end of the segment. Thus, when the number of bytes that are estimated to be available for playout is less than the number of bytes needed to avoid a playout stall, the receiver device processor may determine that a playout stall is pending.

When a pending playout stall is recognized, the receiver device processor may request download of the next segment at a lower bit rate representation in block 208. In other words, current strategies may recognize a pending playout stall but may wait to resolve the issues of low bandwidth/playout stalls by requesting a lower bit rate representation for the next download segment based on the above mentioned main rate selection algorithm.

While the main rate selection algorithm may resolve issues caused by low bandwidth (such as playout stalls) in the future, the conventional main rate selection algorithm and other current strategies do not determine whether the impending playout stall could be avoided by cancelling the download of the current segment at the current representation and re-downloading the current segment at a lower bit rate. Further, the current main rate selection algorithm and other current solutions also do not include mechanisms for determining whether other performance objectives or optimizations may be realized by switching representations during the current segment download.

Figure 3:
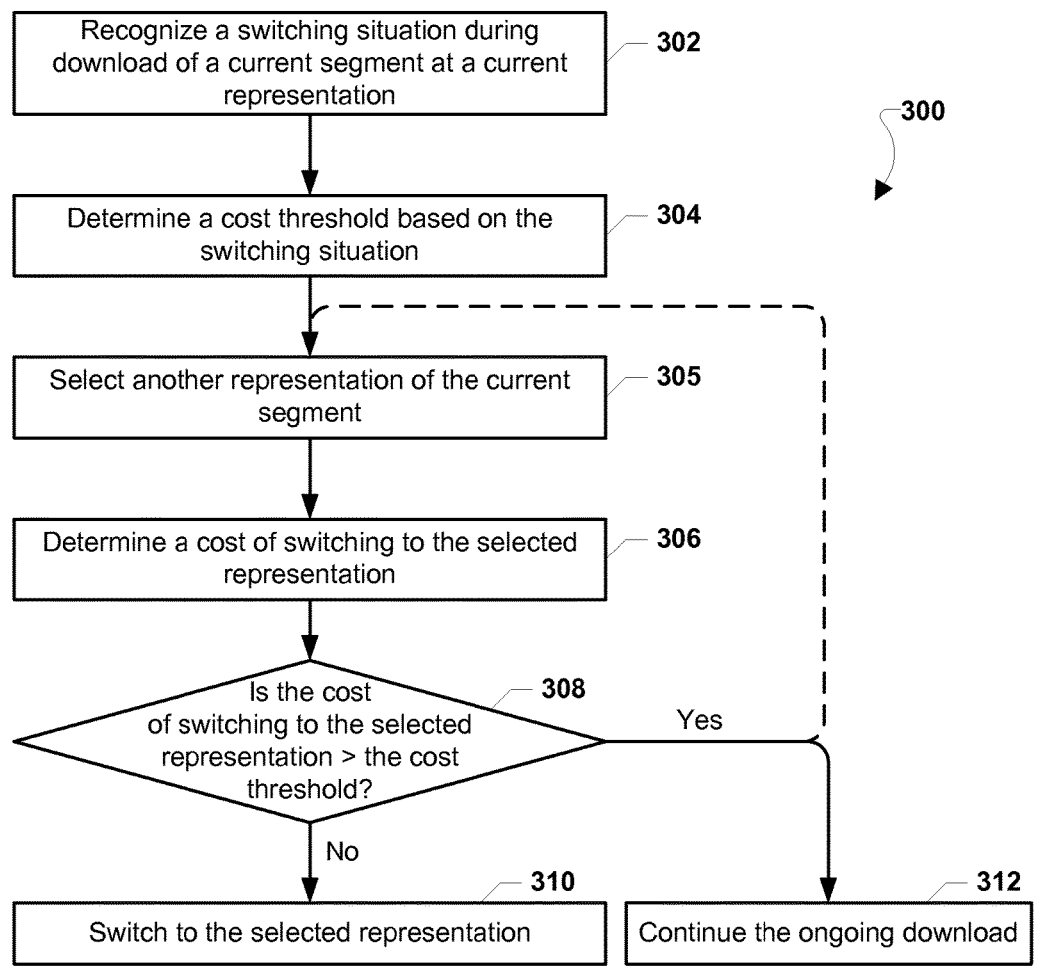
FIG. 3 is a process flow diagram illustrating an embodiment method for switching to another representation of the current segment when the costs of switching to another representation of the current segment do not exceed a cost threshold.

FIG. 3 illustrates an embodiment method 300 that may be implemented by a processor on a receiver device executing a DASH client for performing a cost-benefit analysis to determine whether to switch representations of the current segment to improve the performance of the receiver device. In particular, the embodiment method 300 enables the processor to determine whether to cancel the current download and start over by downloading the current segment at a different representation.

In block 302, the receiver device processor may recognize a switching situation during a download of a current segment at a current representation. As described above, a switching situation may arise when the processor of the receiver device determines that one or more performance objectives (e.g., a smooth playout, a certain power consumption rate, an average bit rate, etc.) will be compromised if current operations are continued. For example, the receiver device processor may detect that a playback stall will occur before the current segment download finishes based upon an estimate of the current bandwidth and the remaining data of the current segment left to download as described above with reference to FIG. 2.

In an embodiment, the receiver device processor may recognize a switching situation in block 302 in response to detecting certain changes in the operation or resources available to the receiver device. For example, the receiver device processor may detect an increase or decrease in bandwidth available for downloading segments, and in response, the receiver device processor may determine whether one or more performance objectives or optimizations may be affected by the increase or decrease in bandwidth. In another example, the receiver device processor may detect that the receiver device's available battery life has dropped below a certain threshold, in which case the receiver device processor may recognize that the current segment should be downloaded at a different (e.g., more power-efficient) representation based on the receiver device's battery charge state to achieve one or more performance objectives or optimizations. Thus, in an embodiment, the switching situation recognized in block 302 may be based on how a change in the receiver device's operation or available resources will affect the receiver device's one or more performance objectives or optimizations.

In block 304, the receiver device processor may determine a cost threshold based on the switching situation. In an embodiment, a cost threshold may be a condition or criteria that would frustrate the one or more underlying performance objectives of switching representations during the current segment download (e.g., achieving smooth playbacks or certain energy consumption) or would otherwise make switching to another representation during the current segment download undesirable.

In an embodiment, the processor may determine the cost threshold based on a performance objective and/or optimization related to the switching situation. For example, when the receiver device processor recognizes that switching representations may be required to achieve a smooth playout in light of a sudden drop in bandwidth, the receiver device processor may calculate the cost threshold based on how much time is available to cancel the current download and to download the current segment at a different representation. In a further example, when the receiver device has three seconds of content stored in the buffer that can be played before the current segment is scheduled for playout, the cost threshold may be three seconds.

In a more sophisticated embodiment, the cost threshold considered in block 304 may include multiple parts and/or conditions, such as a maximum time before the receiver device begins receiving a different representation of the current segment and the time by which the download of the different representation of the current segment must finish to avoid a playout stall. In such an example, the cost threshold may allow three seconds for the download of the current segment at a different representation to begin and two seconds for the download to complete.

In an embodiment in which the performance objective is to maintain a particular average quality of playout, the cost threshold may be a particular average bit rate. For example, switching to the lowest bit rate representation of the current segment may reduce the download time and the total power consumed but may also lower the quality of the playback such that the playout bit rate after switching representations may be under the minimum average bit rate allowed/desired.

In further embodiments, the receiver device processor may utilize multiple cost thresholds in block 304 to represent multiple performance objective and/or optimization. In other words, the receiver device processor may enforce multiple performance/quality standards experienced on the receiver device. For example, before switching representations (e.g., before essentially downloading the current segment twice), the receiver device processor may determine the time available to resolve a pending playout stall (e.g., for a smooth playback performance objective) and a maximum amount of power the receiver device processor may consume to switch representations. Operations for determining a plurality of cost thresholds is further described below with reference to FIG. 8.

In still further embodiments, the receiver device processor may determine the one or more cost thresholds conservatively to account for unpredictable additional costs needed to switch representations. For example, the processor may add additional time (e.g., "cushioning") to a time cost threshold to account for unforeseen delays, such as failures to connect to the server. Thus, a cost threshold considered in block 304 may include an ideal assessment of the time or other resources needed to switch representations, as well as an adjustment for unforeseeable additional costs.

In block 305, the receiver device processor may select another representation of the current segment based on the nature of the switching situation. For example, the receiver device processor may select a representation with a lower or lowest bit rate available for the current segment when a playout stall is predicted because the currently downloading segment is of a bit rate that cannot be supported by the current bandwidth. As another example, the receiver device processor may select a representation with a higher or highest bit rate available for the current segment when a sudden increase in bandwidth is detected.

In block 306, the receiver device processor may determine a cost of switching to the selected representation for downloading of the current segment, which involves canceling the current download and restarting a download of the current segment of the selected representation. The process of cancelling the download of the current segment at the current representation and re-downloading the current segment at the selected representation involves a certain amount of time and requires the receiver device to spend resources (e.g., additional power) to accomplish the task. For example, the costs of switching may include the time required to effect the representation switch, including the time to tear down one TCP session and to establish a new TCP session, plus the time to download the entire current segment at the selected representation because the receiver device processor discards any portions of the current segment already received. Further costs may include the additional time required to receive and discard data of the initially requested representation to the receiver device (e.g., "in-flight" bytes) that are currently en route to the receiver device. Determining the cost of switching representations in terms of time is further described below with reference to FIG. 7.

In other examples, the costs of switching representations may be calculated in terms of power consumption, average bit rate, and in relation to various other performance objectives and/or optimizations.

In determining the costs of switching current segment representations, the receiver device processor may include additional "cushioning" to the total costs calculated. For example, when estimating the total time required to switch representations, the receiver device processor may inflate one or more individual costs (e.g., the round-trip time for messages sent from the receiver device to the HTTP server and back) to account for unforeseen delays or additional processing time. In another embodiment, the receiver device processor may include this "cushioning" in the total calculate costs in addition to or instead of inflating the cost threshold as discussed above with reference to block 304.

In determination block 308, the receiver device processor may determine whether the cost of switching to the selected representation exceeds one or more cost thresholds. In other words, a receive device processor may evaluate whether immediately switching to another representation of the segment is a better option than continuing with the currently selected representation including whatever playback stall or other impact that is anticipated to occur. For example, in light of entering a low battery state, the receiver device processor may determine whether switching to a representation with a lower bit rate to reduce power consumption would benefit the receiver device given the power needed to switch representations. As another example, the receiver device processor may determine whether the time needed to switch representations exceeds the amount of time before a pending playout stall occurs and whether the amount of power needed to switch representations is lower than a power threshold. In such embodiments, the receiver device processor may determine that switching representations is not appropriate when the costs of switching representations exceed any of the one or more cost thresholds. The process of determining whether the costs of switching representations exceeds one or more cost thresholds is further described below with reference to FIG. 8.

When the receiver device processor determines that the cost of switching to another representation of the current segment does not exceed the cost threshold, (i.e., determination block 308="No"), the processor may switch to the selected representation in block 310, such as by starting the process of cancelling or abandoning the ongoing download of the current segment at the current representation and requesting download of the current segment at the selected representation.

In an embodiment, the representation to which the receiver device processor switches may be consistent with the determined costs of switching and the one or more cost thresholds. Thus, in this embodiment, the selection of another representation in block 305 may be performed after and based upon the costs of switching determined in block 306.

In a further embodiment, the processes of selecting another representation in block 305 and determining the costs of switching in block 306 may be performed iteratively, such as after the determination of cost acceptability performed in determination block 308 as indicated in the dashed line. In this embodiment, the processes of may result in selection of a best representation that does not exceed the cost threshold. For example, the processor may switch from a 512 kB bit rate representation to a 256 kB bit rate representation because the 256 kB bit rate is the next best bit rate representation and because switching to the 256 kB bit rate would not exceed the cost threshold. Switching to the best available representation is further described below with reference to FIGS. 5 and 9.

When the receiver device processor determines that the cost of switching to another representation of the current segment exceeds the costs threshold (i.e., determination block 308="Yes"), or that there is no other representation that will avoid an impending playout stall (or impact another performance objective) the receiver device processor may take no action and continue the ongoing download in block 312. In this situation, the receiver device processor may wait to resolve the issue(s) with segment downloads with the next segment by performing the main rate selection algorithm to select the appropriate representation for the next segment. For example, even though the processor anticipates a playback stall, the processor may do nothing when the new representation of the current segment would not be downloaded and available for playback before the anticipated playback stall is expected to occur.

Figure 4:
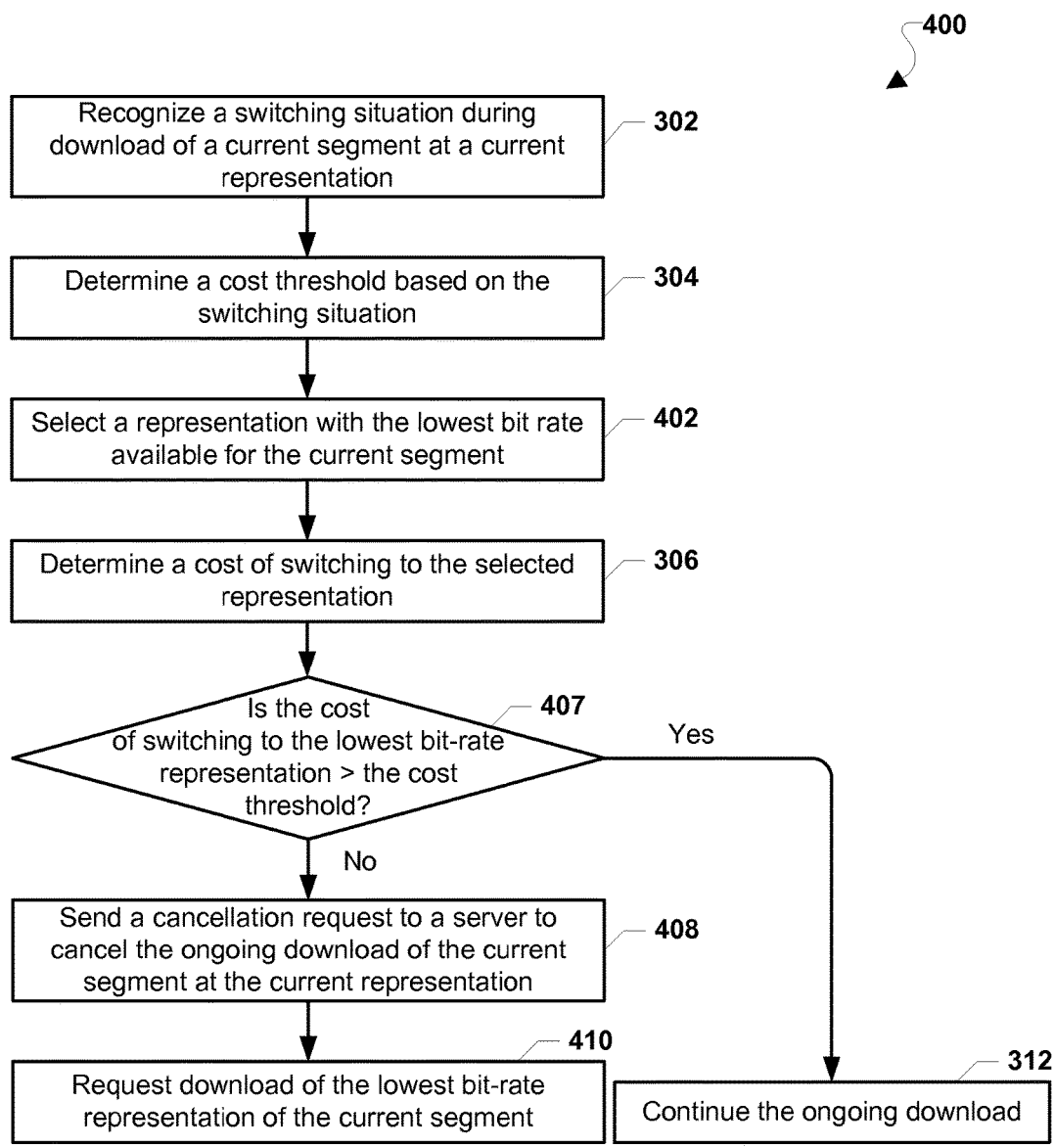
FIG. 4 is a process flow diagram illustrating an embodiment method for determining whether the costs of switching to a minimum-cost representation of the current segment exceed a cost threshold.

FIG. 4 illustrates an embodiment method 400 that may be implemented by a receiver device processor for determining whether to switch to a representation with the lowest bit rate in response to recognizing a switching situation due to a drop in reception bandwidth. The operations of method 400 implement an embodiment of the operations of method 300 described above with reference to FIG. 3. In an embodiment, the receiver device processor may perform the operations of method 400 when the receive device processor has very little time to determine whether to switch representations in light of recognizing a degraded bandwidth switching situation.

The receiver device processor may recognize a switching situation during download of a current segment at a current representation in block 302 as described above with reference to FIG. 3. For example, the receiver device processor may recognize a sudden drop in bandwidth, recognize when the receiver device enters a low-power state, or recognize various other events that may affect one or more performance objectives and/or optimizations of the receiver device.

In block 304, the receiver device processor may determine a cost threshold based on the switching situation and one or more performance objectives and/or optimizations related to the switching situation as described above. For example, the receiver device processor may recognize that switching representations may be required to achieve a certain consistent rate of power consumption in light of a sudden drop in bandwidth.

In block 402, the receiver device processor may select a representation with the lowest bit rate available for the current segment. After recognizing a switching situation, the receiver device processor may have a very short period of time to determine whether switching representations may benefit the performance of the receiver device, such as by satisfying one or more performance objectives and/or optimizations. In such a situation, the receiver device processor may not have time to determine an optimum representation, and thus only have time to determine whether switching to the lowest bit-rate representation will benefit the performance of the receiver device. In an embodiment, switching representations from the current representation to the lowest bit-rate representation (e.g., the minimum-cost representation) may require the least amount of time and/or resources because the lowest bit-rate representation has the smallest amount of data to receive, thereby requiring less time and power to receive than other representations.

In block 306, the receiver device processor may determine a cost of switching to the selected representation with the lowest bit rate. As discussed above, depending on the particular performance objectives and/or optimizations related to the recognized switching situation, the receiver device processor may determine the costs of switching to the minimum-cost representation in terms of time (e.g., how long it would take to switch to the minimum-cost representation), power (e.g., how much power would be required to switch to the minimum-cost representation), and/or other factors as described above.

In determination block 407, the receiver device processor may determine whether the cost of switching to the lowest bit-rate representation exceeds the cost threshold. As described above with reference to FIG. 3, the receiver device processor may only switch representations when switching would benefit the performance of the receiver device or otherwise satisfy one or more performance objectives and/or optimizations. In an embodiment, because the selected representation is the minimum-cost representation, the cost determined in block 306 may represent the minimum cost for switching to another representation, such that if the receiver device processor determines that the costs of switching to the lowest bit-rate representation exceed the cost threshold, the receiver device may not benefit from switching to any other representation since other representations are likely to have a cost that is the same or greater than the lowest bit-rate representation.

When the receiver device processor determines that the cost of switching to the lowest bit-rate representation exceeds the cost threshold (i.e., determination block 407="Yes"), the processor may continue the ongoing download in block 312. When the receiver device processor determines that the cost of switching to the lowest bit-rate representation does not exceed the cost threshold (i.e., determination block 407="No"), the processor may send a cancellation request to a server to cancel the ongoing download of the current segment at the current representation in block 408. In an embodiment in which there is no cancellation feature, such as in HTTP, the receiver device processor may simply perform a TCP teardown to stop the download of the current download at the current representation.

In block 410, the receiver device processor may request download of the lowest bit-rate representation of the current segment. In an embodiment, the receiver device processor may establish a new TCP connection with the HTTP server and may request download of the lowest bit-rate representation of the current segment.

Figure 5:
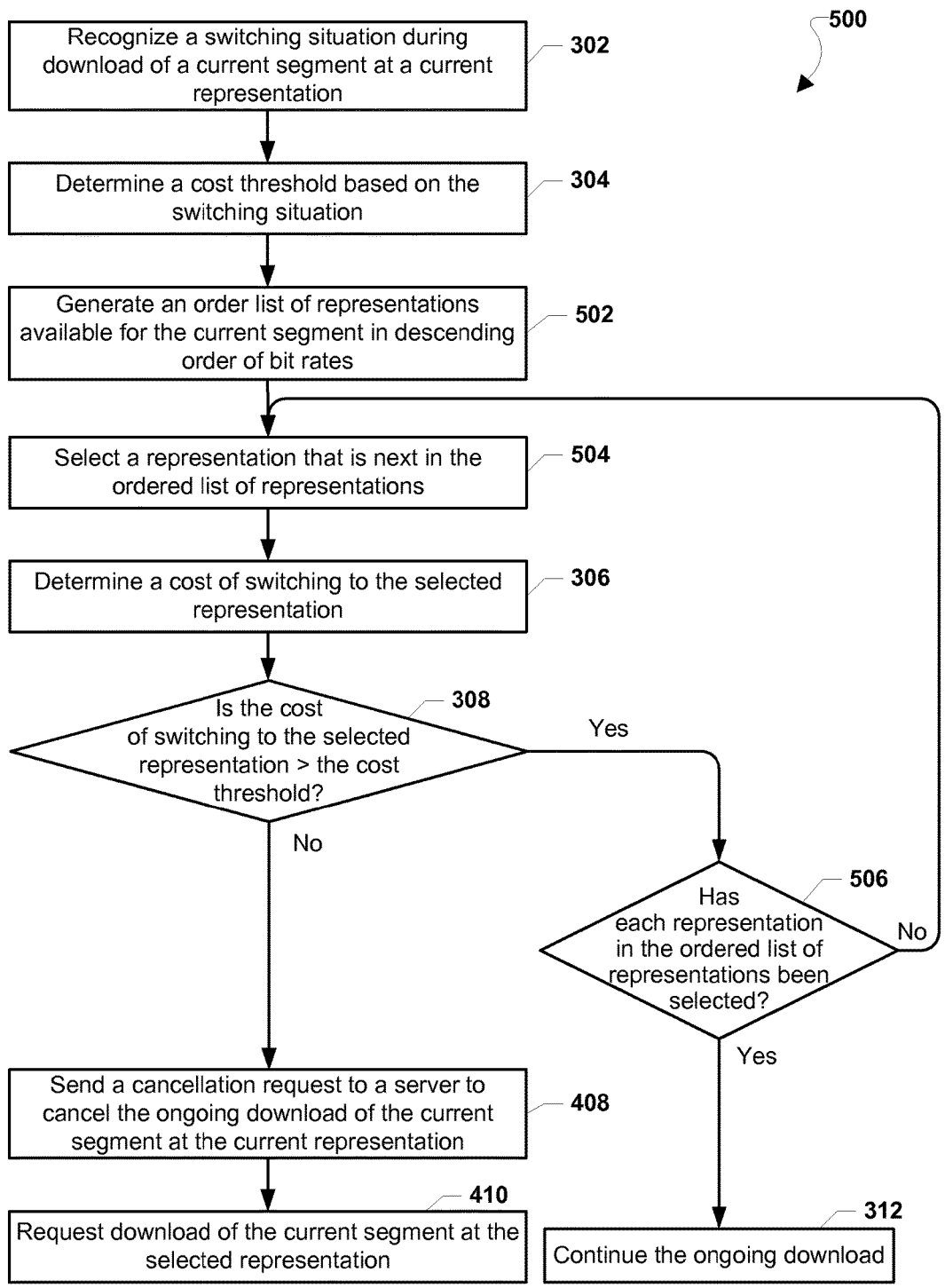
FIG. 5 is a process flow diagram illustrating an embodiment method for switching to the best-available representation of the current segment.

FIG. 5 illustrates an embodiment method 500 that may be implemented by a processor operating on a receiver device for determining the highest bit rate representation that may satisfy one or more performance objectives and/or optimizations in response to recognizing a switching situation. The operations of method 500 implement an embodiment of the operations of method 300 described above with reference to FIG. 3.

In block 302, the receiver device processor may recognize a switching situation during download of a current segment at a current representation as described above with reference to FIG. 3. In an embodiment, the receiver device processor may perform method 500 when the switching situation indicates that switching to a representation with a higher or lower bit rate than the current representation may benefit the receiver device (e.g., a sudden increase or drop in bandwidth, the receiver device's entering a low-power state, the receiver device being connected to a charger, or various other events that may affect one or more performance objectives and/or optimizations of the receiver device).

In block 304, the receiver device processor may determine a cost threshold based on the switching situation. As described above, the receiver device processor may determine the cost threshold based on one or more performance objectives and/or optimizations related to the switching situation.

In block 502, the receiver device processor may generate an ordered list of representations available for the current segment in descending order of bit rates. In an embodiment, the generation of an ordered list of representations available for segments in block 502 may be performed before a switching situation arises, such at the start of downloading a video stream, or another time when the receiver device processor is informed of all sources of content representations.

In block 504, the receiver device processor may select a representation that is next in the ordered list of representations. In an embodiment, the receiver device processor may first select the representation with the highest bit rate in the list and may subsequently select other representations with decreasing bit rates. In an embodiment, the receiver device processor may iteratively check available representations in a descending order of bit rates. When the switching situation is due to a sudden increase in bandwidth, the processor may begin checking available representation starting from the highest bit rate. When the switching situation is due to a sudden decrease in bandwidth, the processor may begin checking available representation starting with a representation that has a bit rate less than the current representation's bit rate.

In block 306, the receiver device processor may determine a cost of switching to a selected representation. In determination block 308, the receiver device processor may determine whether the cost of switching to the selected representation exceeds the cost threshold. In an embodiment, as the receiver device processor selects representations in the ordered list, the processor may test each selected representation to determine whether the receiver device may benefit from switching to the selected representation as described above.

When the receiver device processor determines that the cost of switching to the selected representation does not exceed the cost threshold (i.e., determination block 308="No"), the processor may send a cancellation request to a server to cancel the ongoing download of the current segment at the current representation in block 408 as described above with reference to FIG. 4. For example, the receiver device processor may perform a TCP teardown to stop the download of the current download at the current representation. The receiver device processor may also request download of the current segment at the selected representation in block 410.

When the receiver device processor determines that the cost of switching to the selected representation exceeds the cost threshold (i.e., determination block 308="Yes"), the processor may determine whether each representation in the ordered list of representations has been selected in determination block 506. In other words, the receiver device processor may sequentially select each representation in the ordered list of representations until it determines that the costs of switching to a selected representation will not exceed the cost threshold or until all representations have been evaluated.

When the receiver device processor determines that there is another representation in the ordered list to evaluate (i.e., determination block 506="No"), the process may select the next representation in the ordered list in block 504 and repeat the evaluations in blocks 306 and 308 described above.

When the receiver device processor determines that each representation in the ordered list of representations has been selected (i.e., determination block 506="Yes"), the processor may continue the ongoing download in block 312, in which case the issues prompting the switching situation will be addressed by performing operations of the main rate selection algorithm described above.

In further embodiments (not shown), the receiver device processor may perform the operations of method 500 when the processor has sufficient time to determine whether the receiver device may benefit or otherwise satisfy one or more performance objectives and/or optimizations by switching to one of the selected representations in the list. In an embodiment, when the receiver device processor determines that there is insufficient time to test each representation in the ordered list of representations, the processor may perform the operations of method 400 as described above with reference to FIG. 4.

Figure 6:
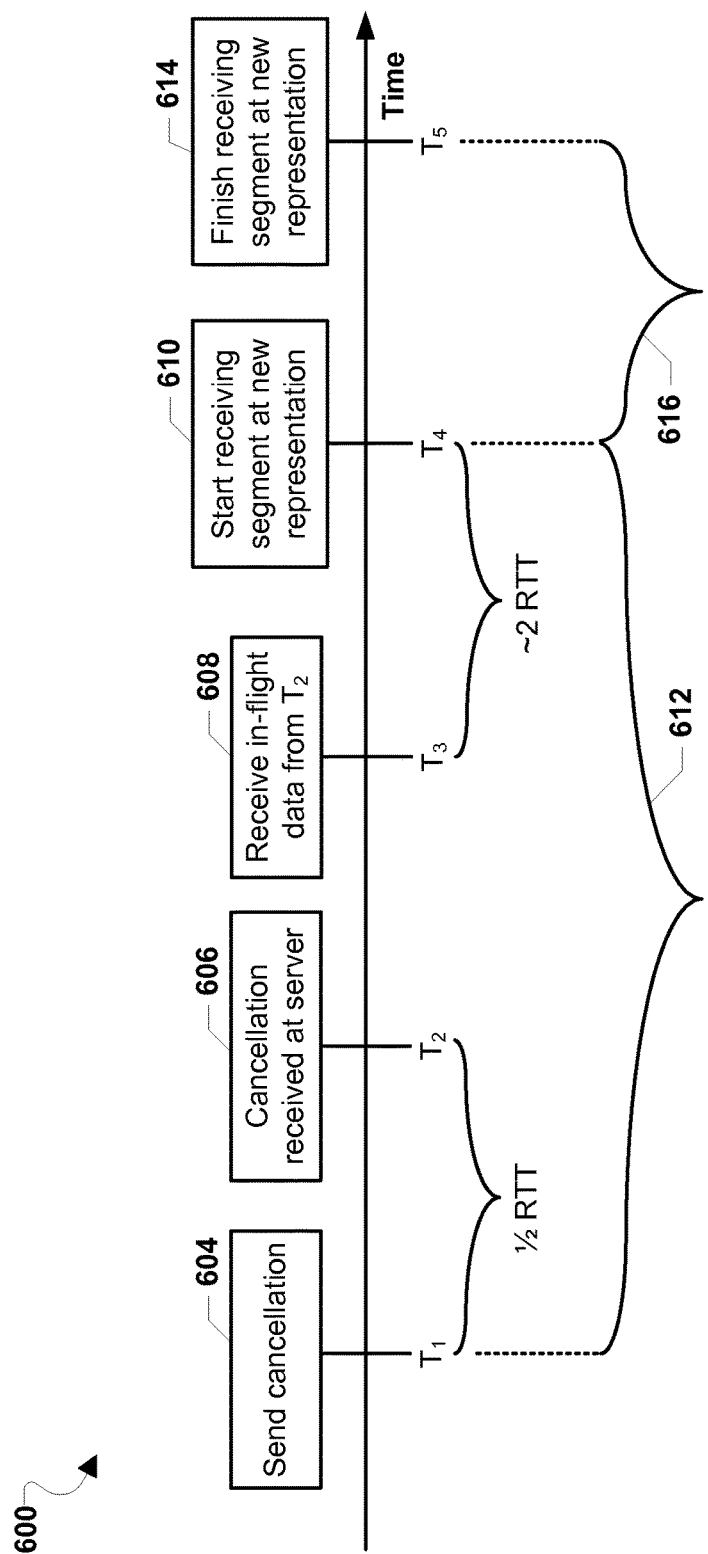
FIG. 6 is a timeline diagram illustrating operations required to switch representation.

FIG. 6 is a timeline diagram 600 representing the time required to switch representations for a current segment. In an embodiment, in response to recognizing a pending playout stall caused by a sudden drop in bandwidth, the receiver device processor may determine whether there is enough time to switch from the currently downloading representation of the current segment to a representation with a lower bit rate to avoid the playout stall. To make this determination, the receiver device processor may estimate the time needed to perform various operations required to switch representations illustrated in FIG. 6. The process of switching representations may begin at a first time 604 (e.g., time $T_1$) by sending a cancellation message to the HTTP server (e.g., as part of a TCP teardown process). The cancellation message sent to the HTTP server may take an estimated one-half round-trip time (½ RTT) from the moment when the receiver device sends the cancellation request at the first time 604 until when the HTTP server receives and processes the cancellation request at a second time 606 (e.g., time $T_2$).

During the time between when the receiver device processor sends the cancellation request and when the HTTP server receives the cancellation request (e.g., between times $T_1$ and $T_2$), the HTTP server may continue sending current segment data to the receiver device that the receiver device will receive (e.g., the in-flight data) at a third time 608 (e.g., time $T_3$). For example, the HTTP server may send data for the current segment to a router, which may continue to send in-flight data to the receiver device for the download of the current segment at the current representation regardless of whether the HTTP server has since stopped sending download data for the current segment at the current representation. As a result, the receiver device may discard all of the in-flight data from the third time 608 (i.e., time $T_3$) until the receiver device finally begins receiving download data for the current segment at the new representation at a fourth time 610 (e.g., time $T_4$). In an example, the amount of time required to flush the in-flight data from the data pipeline (e.g., the period of time between the third time 608 and the fourth time 610) may be approximately two round-trip times (e.g., 2 RTT).

In an embodiment, the time needed to cancel the ongoing download of the current segment at the current representation may be the time period 612 between times $T_1$ and $T_4$, which includes the time from when the receiver device sends the cancellation request at a first time $T_1$ 604 until when the receiver device begins receiving the current segment at the new representation at a fourth time $T_4$ 610. In another embodiment, the time needed to download the current segment at the new representation may be the time period 616 between the fourth time $T_4$ 610 and a fifth time $T_5$ 614 when the download of the current segment at the new representation will be finished. Thus, the cost of switching representations to a new representation may be the total time needed to switch representations, calculated as the sum of the time period 612 to cancel the first download and request download of a different representation plus the time period 616 to complete the download of the different representation. Calculating the costs of switching representations in terms of time is further described below with reference to FIG. 7.

While the timeline diagram 600 illustrates costs of switching representations in terms of time, it is anticipated that the receiver device processor may calculate the costs of switching representations in other terms, such as the power required to switch to a new representation.

Figure 7:
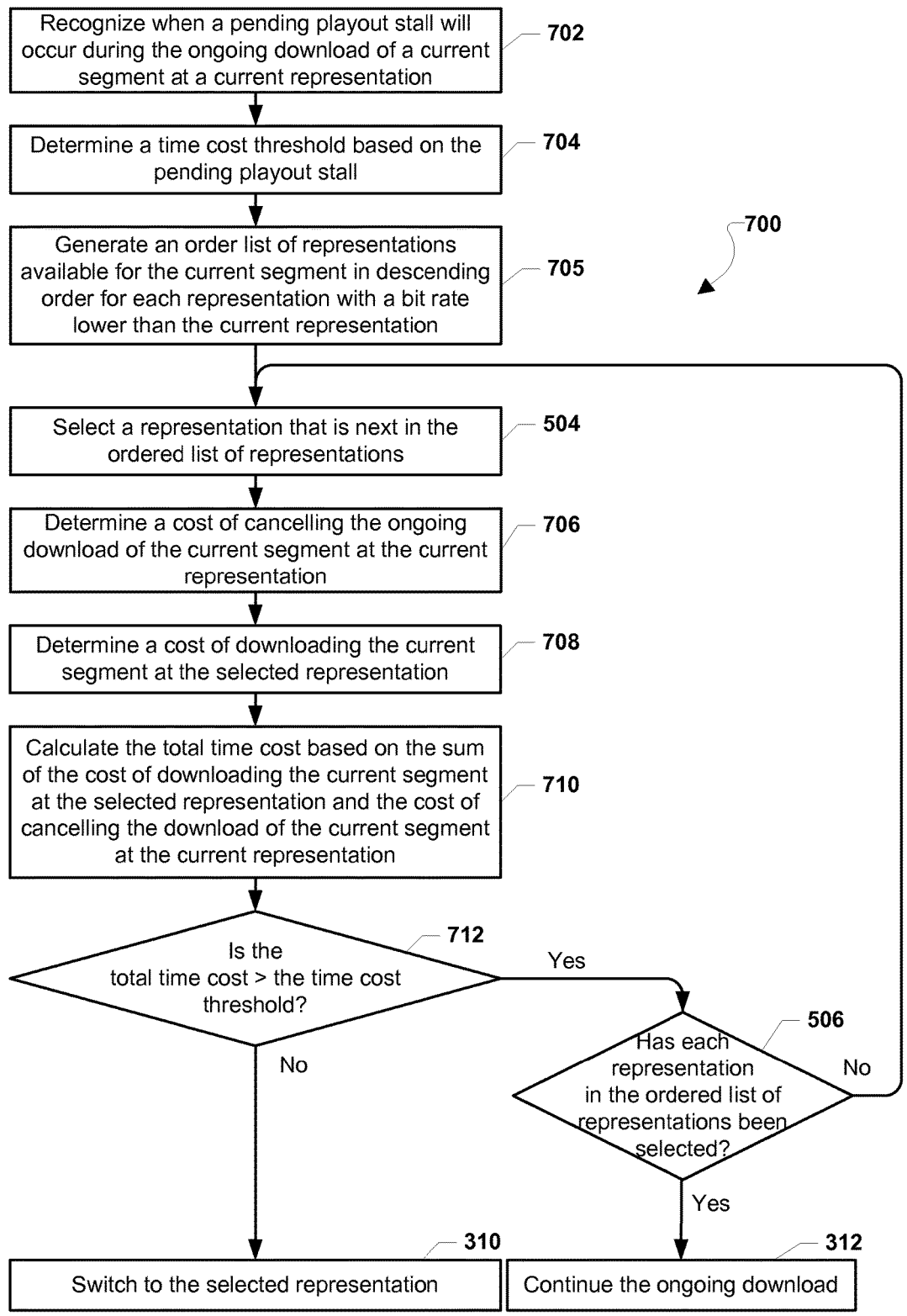
FIG. 7 is a process flow diagram illustrating an embodiment method for switching representations to avoid a pending playout stall.

FIG. 7 illustrates an embodiment method 700 that may be implemented by a receiver device processor for switching representations to avoid a playout stall when the total time required to switch representations does not exceed a time cost threshold. The operations of method 700 implement an embodiment of the operations of method 300 described above with reference to FIG. 3.

In block 702, the receiver device processor may recognize when a pending playout stall will occur during the ongoing download of a current segment at a current representation. In other words, as the receiver device downloads the current segment, the processor may detect that the playout buffer will become empty (e.g., the media has all been played) before some or the entire current segment is available for playout.

In an embodiment, to recognize a pending playout stall, the receiver device processor may obtain several input variables as described above with reference to FIG. 2, such as a bandwidth estimate, a current playback time, a playback model (e.g., whether a partially downloaded segment can be played out), and the total media buffer duration. As discussed above, the receiver device processor may obtain this information from a configuration parameter or from on-device measurements.

In an embodiment, when predicting the tendency to stall, the receiver device processor may assume that a segment may be played out when partially downloaded, in which case the receiver device processor may determine that no stall will occur so long as the current segment will be completely downloaded before the playback reaches the end of the current segment. In a further embodiment, the receiver device processor may employ a conservative prediction model when determining whether a playout stall will occur.

In an embodiment, the receiver device processor may obtain the following information to predict a pending playout stall: the current packet rate bandwidth estimate ("pkerrate"), the playout start and end time of the segment that is being downloaded ("segment_start_ptime" and "segment_end_ptime"), the nominal representation bit-rate of the current segment from the MPD ("rep_bit_rate"), the estimated round-trip-time between the receiver device and the HTTP server without counting the queuing delay ("rtt"), and a bandwidth-delay-product ("bdp") calculated as the product of pkerrate and RTT. The receiver device processor may also determine the aggregate of all receiver buffer sizes from every active TCP connection ("total_revbuf"), in which an "active" TCP connection may refer to a TCP connection that has an on-going data transfer. The receiver device processor may also determine the current playback time of media presentation ("current_ptime"), the number of bytes in the current segment that has already been downloaded ("bytes_downloaded"), and the relative weight of the adaptation set to which the current segment belongs ("as_weight"). In an embodiment, as_weight may be a value between 0 and 1. The receiver device processor may also determine the relative weight for an adaptation set ("as_pkerrate") as the product of pkerrate and as_weight.

In an embodiment, the receiver device processor may predict a playout stall by using the information described above in the following algorithm presented in puedocode:

```
segment_duration = segment_end_ptime - segment_start_ptime;
nominal_segment_size = rep_bit_rate * segment_duration;
bytes_available = as_pkerrate * (segment_end_ptime - current_ptime);
bytes_needed = nominal_segment_size - bytes_downloaded;
if (bytes_available < bytes_needed)
    stall_prediction = true;
```

In other words, the receiver device processor may predict a playout stall (e.g., "stall_prediction=true") when the number of bytes available for playout (e.g., "bytes_available") is less than the number of bytes needed to ensure a smooth playout (e.g., "bytes_needed").

Returning to FIG. 7, the receiver device processor may determine a time cost threshold based on the pending playout stall in block 704. In an embodiment, the time cost threshold may represent the amount of time before the playout stall occurs, such as the amount of time before the receiver device processor begins playing the current segment. In a further embodiment, the time cost threshold may include multiple conditions/thresholds. For example, the time cost threshold may require that a re-download of the current segment at a different representation begins before a certain time and may also require the download to finish before another certain time. In such an example, switching representations may avoid the playout stall only when the download of the current segment at a different representation will start before the receiver device processor starts playing out the current segment and only when the download of the current segment at the different representation will finish before the playout reaches the end of the current segment.

In block 705, the receiver device processor may generate an ordered list of representations available for the current segment in descending order for each representation with a bit rate lower than the current representation. In an embodiment, the receiver device processor may iteratively check available representations in a descending order of bit rates to determine the best available representation to which the receiver device processor may switch representations.

In another embodiment, the receiver device processor may generate the ordered list of representations to include only the representation with the lowest bit rate. In such an embodiment, the receiver device processor may quickly determine whether switching to the minimum-cost representation would avoid the playout stall as described above with reference to FIG. 4.

As discussed above with reference to block 502 in FIG. 5, the generation of an ordered list of representations available for segments in block 705 may be performed before a switching situation arises, such at the start of downloading a video stream or another time when the receiver device processor is informed of all sources of content representations.

In block 504, the receiver device processor may select a representation that is next in the ordered list of representations. In an embodiment, the receiver device processor may first select the representation with the highest bit rate in the list and may subsequently select other representations with decreasing bit rates.

In block 706, the receiver device processor may determine a cost of cancelling the ongoing download of the current segment at the current representation. In an embodiment, the cost of cancelling the download may include two parts: the time required to tear down and set up a new TCP connection with the HTTP server (an "RTT overhead cost") and the time required to flush in-flight data from the data pipeline (an "in-flight data overhead cost").

In an embodiment, the RTT overhead cost may include the time needed to tear down/reset the TCP connection with the HTTP server, which may include sending a cancellation message to the HTTP server that takes roughly one-half RTT to reach the HTTP server. The RTT overhead cost may also include the time needed to start a new TCP connection with the HTTP server to request a download of the current segment at the selected representation. To start a new TCP connection, the receiver device processor and the HTTP server may establish a new connection (e.g., undergo a handshake procedure), which may take one to two RTT. Further, the new TCP connection may implement a "slow start" algorithm, meaning that the TCP connection gradually ramps up to maximum capability after roughly two to three RTT. In a further embodiment, one or more aspects of the RTT overhead cost described above may include additional time (e.g., cushioning) used to produce a conservative estimate of the time needed to tear down an existing TCP connection and start a new TCP connection with the HTTP server.

The in-flight data overhead cost may include the time required to flush in-flight data from the data pipeline as described above with reference to FIG. 6. Thus, even though the in-flight data is discarded at the receiver device, the in-flight data may take time and bandwidth to receive and discard, thereby increasing the overhead time required to re-download a current segment at a different representation.

In block 708, the receiver device processor may determine a cost of downloading the current segment at the selected representation. In an embodiment, the receiver device processor may calculate the size of the current segment at the selected representation as the product of the selected representation's bit rate and the current segment's playout start and end times. The receiver device processor may then calculate the time needed to download the current segment at the selected representation (e.g., the cost of downloading the current segment) by dividing the size of the current segment at the selected representation by the estimated bandwidth for the adaptation set to which the current segment belongs.

In block 710, the receiver device processor may calculate the total time cost based on the sum of the cost of downloading the current segment at the selected representation and the cost of cancelling download of the current segment at the current representation.

In another embodiment (not shown), the receiver device processor may convert various units of the above calculations into units of time such that the total time cost is in units of time (e.g., seconds or milliseconds).

In determination block 712, the receiver device processor may determine whether the total time cost exceeds the time cost threshold (e.g., whether switching representations to the selected representation may avoid the playout stall). In an embodiment, the receiver device processor may determine that switching representations may only benefit the performance of the receiver device when there is a high likelihood that switching representations to the selected representation will completely avoid the playout stall. In such an embodiment, the receiver device processor may implement a policy that not switching representations may be appropriate when a playout stall cannot or may not be avoid because the lower bit-rate/quality caused by switching representations in addition to the playout stall (even when the playout stall is made slightly shorter) may have an overall worse impact on the user experience than suffering through the anticipated playout stall.

When the receiver device processor determines that the total time cost does not exceed the time cost threshold (i.e., determination block 712="No"), the processor may switch to the selected representation in block 310 as described above with reference to FIG. 3.

When the receiver device processor determines that the total time cost exceeds the time cost threshold (i.e., determination block 712="Yes"), the processor may determine whether each representation in the ordered list of representations has been selected in determination block 506. In an embodiment, the receiver device processor may select each representation with a bit rate lower than the current representation in descending order to determine the representation with the highest bit rate available for the current segment that will avoid the playout stall.

When the receiver device processor determines that there is another representation in the ordered list of representations to select (i.e., determination block 506="No"), the processor may select the representation that is next in the ordered list of representations in block 504. This process may continue in a loop so long as the receiver device processor has not selected each representation in the ordered list of representations.

When the receiver device processor determines that each representation in the ordered list of representations has been selected (i.e., determination block 506="Yes"), the processor may continue the ongoing download in block 312. In other words, the receiver device processor may not attempt to avoid the playout stall and may instead resolve future playout issues by performing the main rate selection algorithm.

Figure 8:
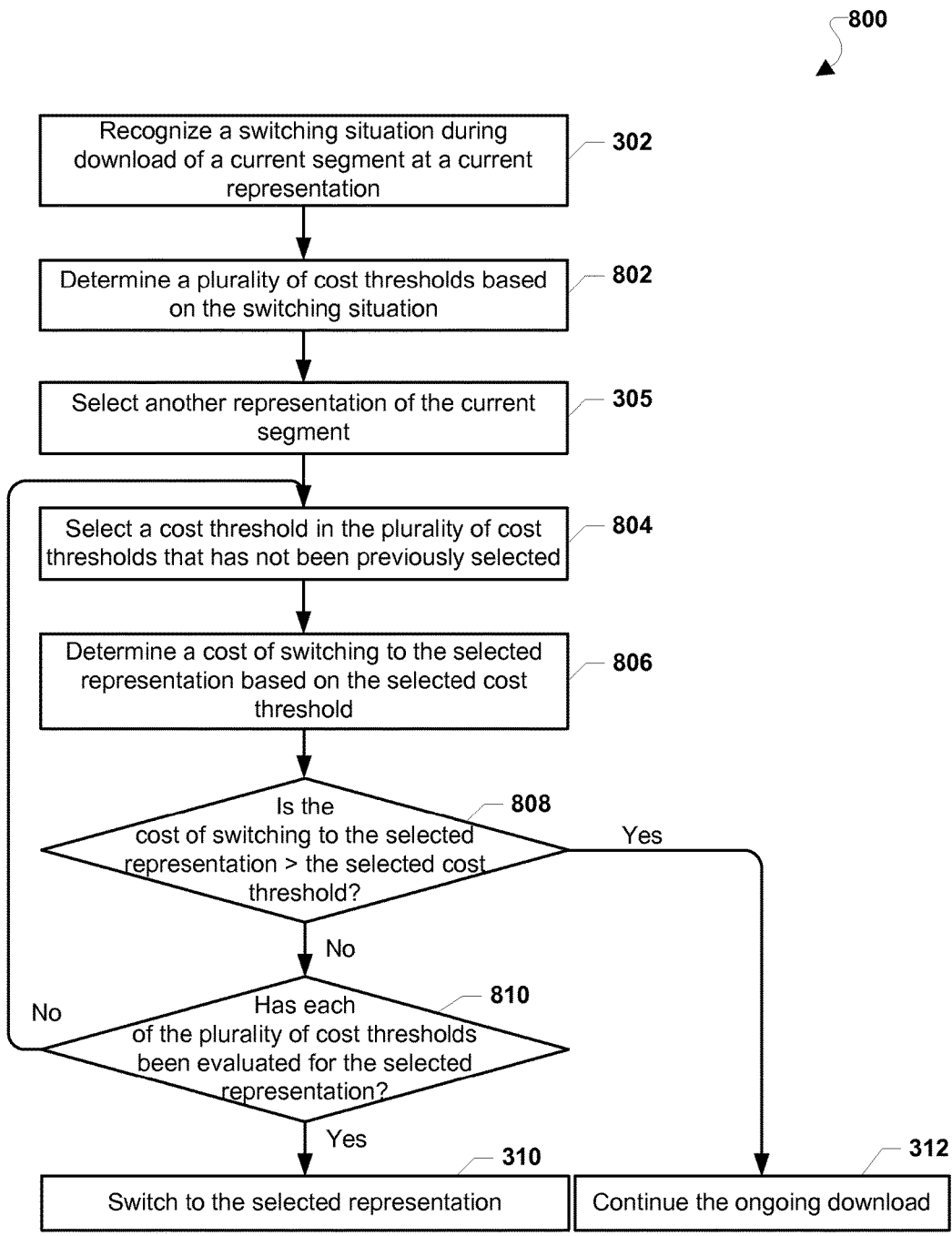
FIG. 8 is a process flow diagram illustrating an embodiment method for switching to a representation when the costs of switching to that representation do not exceed one or more cost thresholds associated with one or more performance objectives and/or optimizations.

FIG. 8 illustrates an embodiment method 800 that may be implemented by a receiver device processor for switching to another representation to satisfy multiple performance objectives and/or optimizations. The operations of method 800 may implement an embodiment of the operations of method 300 described above with reference to FIG. 3.

In block 302, the receiver device processor may recognize a switching situation during a download of a current segment at a current representation. As described above with reference to FIG. 3, a switching situation may arise when the processor determines that one or more performance objectives (e.g., a smooth playout, a certain power consumption rate, an average bit rate, etc.) may be compromised during the download of the current segment based on a change in the receiver device's available resources.

In block 802, the receiver device processor may determine a plurality of cost thresholds based on the switching situation. For example, the receiver device processor may attempt to ensure that an average bit rate/playout quality is maintained, as well as certain power consumption performance objectives and a smooth playout. In an embodiment further described below, the receiver device processor may use the plurality of cost thresholds to determine whether switching representations will satisfy various performance objectives and/or optimizations.

In block 305, the receiver device processor may select another representation of the current segment. For example, the receiver device processor may select a representation that has the lowest bit rate or highest bit rate available for the current segment. In an embodiment discussed above with reference to FIGS. 5 and 7, the receiver device processor may generate an ordered list of representations available for the current segment in descending order for each representation with a bit rate lower than the current representation. In this embodiment, the receiver device processor may iteratively check representations in the ordered list in a descending order of bit rates to select a representation (if any) for which the cost of switching to that representation does not exceed any of the plurality of cost thresholds as further described below.

In block 804, the receiver device processor may select a cost threshold in the plurality of cost thresholds that has not been previously selected, and determine whether the cost of switching to the selected representation will exceed any of the plurality of cost thresholds. In other words, the receiver device processor may test whether a selected representation satisfies the performance objectives and/or optimizations represented by each of the plurality of cost thresholds.

In block 806, the receiver device processor may determine the cost of switching to the selected representation based on the selected cost threshold. For example, when the receiver device processor selects a cost threshold associated with a smooth-playback performance objective (e.g., as described above with reference to FIG. 7), the receiver device processor may determine the costs of switching to the selected representation in terms of the time required to cancel the download of the current representation and re-download the current segment at the selected representation. In another example, when the receiver device processor selects a cost threshold associated with a power-consumption performance objective, the processor may determine the costs of switching representations to the selected representation in terms of the power required to cancel the download of the current segment and the power required to receive and decode data for the current segment at the selected representation.

In determination block 808, the receiver device processor may determine whether the cost of switching to the selected representation exceeds the selected cost threshold. As described above, the receiver device processor may only switch to a representation when switching would satisfy the performance objective related to the selected cost threshold.

In an embodiment, the receiver device processor may check whether switching to the selected representation would exceed any one of the plurality of cost thresholds. In other words, the receiver device processor may require that switching to a selected representation must satisfy every performance objective associated with the plurality of cost thresholds. For example, the receiver device processor may determine that switching to the selected representation will avoid a playout stall but require too much power to justify conducting the switch. In such situation, the receiver device processor may determine not to switch to the selected representation because every performance objective would not be satisfied by the switch.

When the receiver device processor determines that the costs of switching to the selected representation exceeds the selected cost threshold (i.e., determination block 808="Yes"), the processor may continue the ongoing download in block 312. In other words, when the receiver device processor determines that the costs of cancelling and re-downloading the current segment would not benefit the performance of the receiver device (e.g., the costs exceed one or more cost thresholds in the plurality of cost thresholds), the processor may wait to resolve the issues prompting the switching situation by performing the main rate selection algorithm.

In embodiments in which the receiver device processor implements an ordered list of representations, the receiver device processor may continue selecting representations in the ordered list to determine whether any representation in the ordered list of representations does not exceed any of the plurality of cost thresholds.

When the receiver device processor determines that a cost of switching to the selected representation does not exceed the selected cost threshold (i.e., determination block 808="No"), the processor may determine whether each of the plurality of cost thresholds has been evaluated for the selected representation in determination block 810.

When the receiver device processor determines that there is another cost threshold included in the plurality of cost thresholds to be evaluated against the selected representation (i.e., determination block 810="No"), the processor may select a next cost threshold in the plurality of cost thresholds in block 804. The receiver device processor may continue selecting and evaluating cost thresholds in this manner until all cost thresholds have been evaluated or until the receiver device processor determines that the costs of switching to the selected representation would exceed at least one of the plurality of cost thresholds.

When the receiver device processor determines that all cost thresholds have been evaluated against the selected representation (i.e., determination block 810="Yes"), the processor may switch to the selected representation in block 310 and begin the process of switching representations to the selected representation as described above with reference to FIG. 3.

Figure 9:
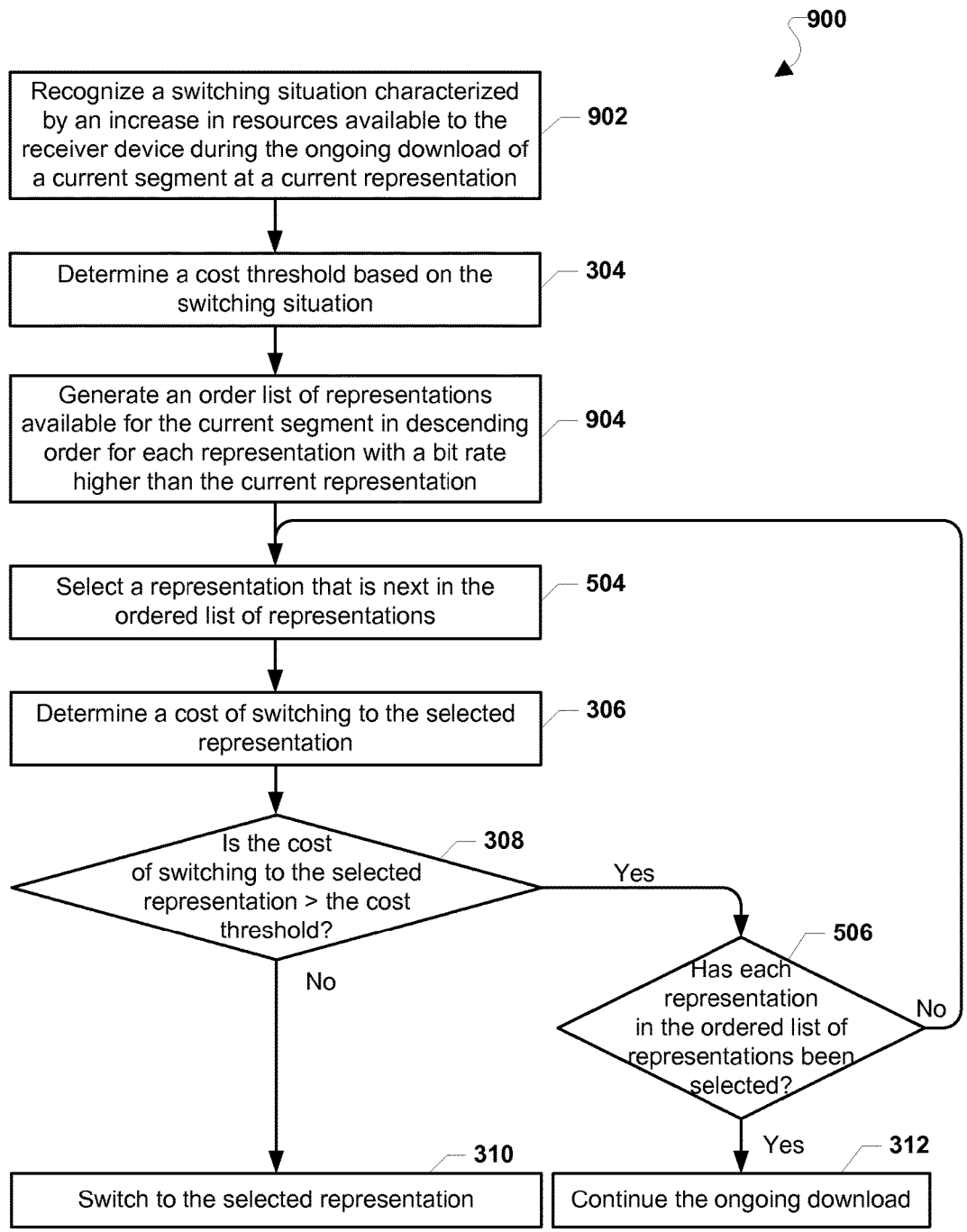
FIG. 9 is a process flow diagram illustrating an embodiment method for determining whether to switch representations in response to recognizing a switching situation characterized by an increase in resources available to the receiver device.

FIG. 9 illustrates an embodiment method 900 that may be implemented by a receiver device processor for determining whether to switch representations when additional resources are available to the receiver device. The operations of method 900 implement an embodiment of the operations of method 300 described above with reference to FIG. 3.

In block 902, the receiver device processor may recognize a switching situation characterized by an increase in resources available to the receiver device during the ongoing download of a current segment at a current representation. For example, the receiver device processor may also recognize when there is a sudden increase in bandwidth, when the receiver device is running in a "high battery" state or running while plugged into a wall outlet, and when various other changes occur in the condition of the receiver device that may enable the receiver device processor to switch to higher bit-rate representations to capitalize on the sudden increase in resources. In these and other situations, the increase in available resources may prompt the receiver device processor to determine whether the receiver device's performance may be improved by switching representations to a representation with a higher bit rate.

In block 304, the receiver device processor may determine a cost threshold based on the switching situation, such as the time before the current segment is played out.

In block 904, the receiver device processor may generate an ordered list of representations available for the current segment in descending order for each representation with a bit rate higher than the current representation. As discussed above, the generation of an ordered list of representations may be accomplished before a switching situation arises, such as at the start of a streaming video download or another time when the receiver device processor is informed of all sources of content representations.

In block 504, the receiver device processor may select a representation that is next in the ordered list of representations. In an embodiment, the receiver device processor may select representations in descending order of bit rate (e.g., starting with the representation with the highest bit rate available for the current segment) and may iteratively check the representations in descending order to attempt to identify the representation that has the highest bit rate such that the cost of switching to that representation does not exceed the cost threshold as described below with reference to determination block 308.

In block 306, the receiver device processor may determine a cost of switching to the selected representation. Even though the receiver device processor has recognized that additional resources are available to the receiver device processor, there may still be costs associated with switching to the selected representation. For example, switching representations may cost time, battery power, etc.

In determination block 308, the receiver device processor may determine whether the cost of switching to the selected representation exceeds the cost threshold. For example, the receiver device processor may recognize that there has been a sudden increase in bandwidth but may ultimately determine that switching representations to a higher bit rate may cause a playout stall because there is not enough time to cancel, restart, and finish the download of the current segment at the selected representation.

When the receiver device processor determines that the cost of switching to the selected representation does not exceed the cost threshold (i.e., determination block 308="No"), the processor may switch to the selected representation in block 310, such as by sending a cancellation request and requesting download of the current segment at the selected representation.

When the receiver device processor determines that the cost of switching to the selected representation exceeds the cost threshold (i.e., determination block 308="Yes"), the processor may determine whether each representation in the ordered list of representations has been selected in determination block 506 as described above with reference to FIG. 5.

When the receiver device processor determines that there is another representation in the ordered list of representations to be evaluated (i.e., determination block 506="No"), the processor may select the representation that is next in the ordered list in block 504. In an embodiment, the receiver device processor may continue performing the selection and evaluation of representations until all representations in the ordered list has been evaluated or until the processor determines that the costs of switching to a selected representation do not exceed the cost threshold.

When the receiver device processor determines that all representations in the ordered list of representations have been selected and evaluated (i.e., determination block 506="Yes"), the processor may continue current operations of the ongoing download in block 312. In this event, the receiver device processor may determine that, despite the additional resources available to the receiver device, the costs of cancelling and re-downloading the current segment would not benefit the performance of the receiver device regardless of the representation selected, and may wait to take advantage of the additional resources available to the receiver device when the next segment is requested by performing the main rate selection algorithm at the next segment boundary.

Figure 10:
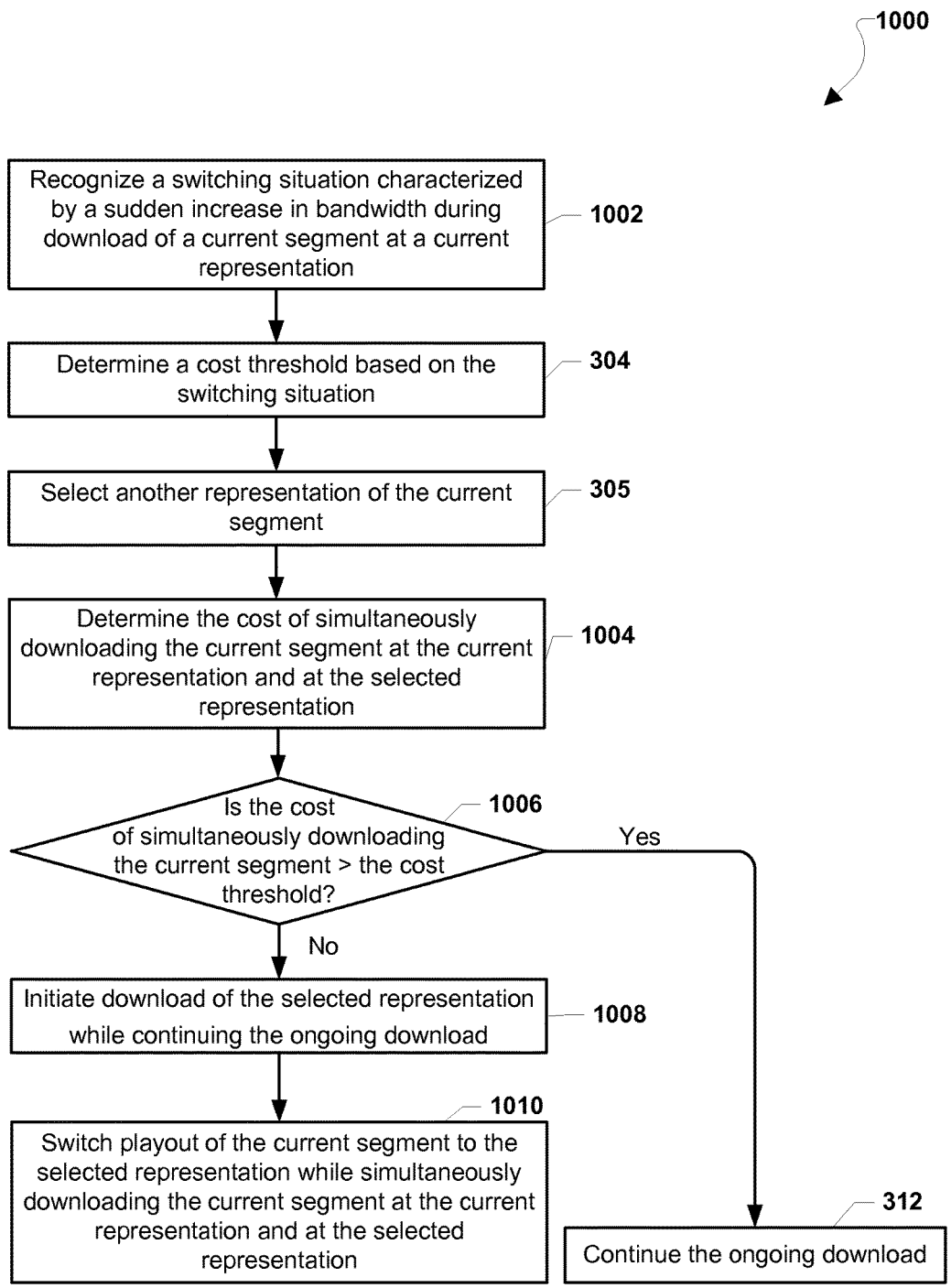
FIG. 10 is a process flow diagram illustrating an embodiment method for determining whether to simultaneously download a current segment at a current representation and a representation with a higher bit rate in response to recognizing a sudden increase in bandwidth.

FIG. 10 illustrates an embodiment method 1000 that may be implemented by a processor operating on a receiver device for determining whether to simultaneously download the current segment at the current representation and at a different representation when the receiver device processor recognizes a sudden increase in bandwidth. The operations of method 1000 implement an embodiment of the operations of method 300 described above with reference to FIG. 3.

In block 1002, the receiver device processor may recognize a switching situation characterized by a sudden increase in bandwidth during download of a current segment at a current representation.

In block 304, the receiver device processor may determine a cost threshold based on the switching situation as described above with reference to FIG. 3. For example, in response to recognizing a sudden increase in bandwidth, the receiver device processor may determine the time before the current segment is played out and/or may determine the amount of power available to switch representations.

In block 305, the receiver device processor may select another representation of the current segment, such as a representation with the highest bit rate available for the current segment. In embodiments described above in which the receiver device processor generates an ordered list of representations available for the current segment, the receiver device processor may perform operations similar to those described above with reference to block 904 of method 900 illustrated in FIG. 9, such as selecting the representation that is next in the ordered list of representations.

In block 1004, the receiver device processor may determine the cost of simultaneously downloading the current segment at the current representation and at the selected representation. In this operation, the receiver device processor may determine whether it is beneficial to leverage the sudden increase in bandwidth to simultaneously download the current segment at the current representation and the selected representation (e.g., a higher bit rate representation) to enable the receiver device processor to switch playout of the current segment from the current representation to the selected representation without having to cancel the download of the current segment at the current representation. By simultaneously downloading the current segment at the selected representation without cancelling the download of the current segment at the current representation, the receiver device processor may avoid the costs of cancelling a download (e.g., the time needed to tear down a TCP connection) and the risk of causing a playout stall by cancelling the download.

In determination block 1006, the receiver device processor may determine whether the cost of simultaneously downloading the current segment exceeds the cost threshold. For example, the receiver device processor may determine that simultaneously downloading two representations would not benefit the receiver device because the receiver device may have low battery power and downloading and decoding two representations may place an unnecessary burden on the receiver device's battery.

When the receiver device processor determines that the cost of simultaneously downloading the current segment does not exceed the cost threshold (i.e., determination block 1006="No"), the processor may initiate download of the selected representation while continuing the ongoing download in block 1008 by sending a download request to the HTTP server for the current segment at the selected representation while continuing to download the current segment at the current representation.

In block 1010, the receiver device processor may switch playout of the current segment to the selected representation while simultaneously downloading the current segment at the current representation and at the selected representation. In an embodiment, the receiver device processor may switch playout to the current download at the selected representation as soon as the current segment at the selected representation is available for playout at the appropriate time, such as at the segment boundary. In an embodiment, the receiver device processor may begin playing the current segment at the current representation until enough of the current segment at the selected representation has been download, and the receiver device processor may switch playout to the selected representation at that point.

When the receiver device processor determines that the cost of simultaneously downloading the current segment exceeds the cost threshold (i.e., determination block 1006="Yes"), the processor may continue the ongoing download in block 312 and take advantage of the sudden increase in bandwidth by performing the main rate selection algorithm at the next segment boundary.

In an embodiment, the receiver device processor may continue evaluating representations in an ordered list of representations against the cost threshold until each representation in the ordered list has been evaluated or until the cost of simultaneously downloading the current segment at the current representation and a particular representation in the list does not exceed the cost threshold.

Figure 11:
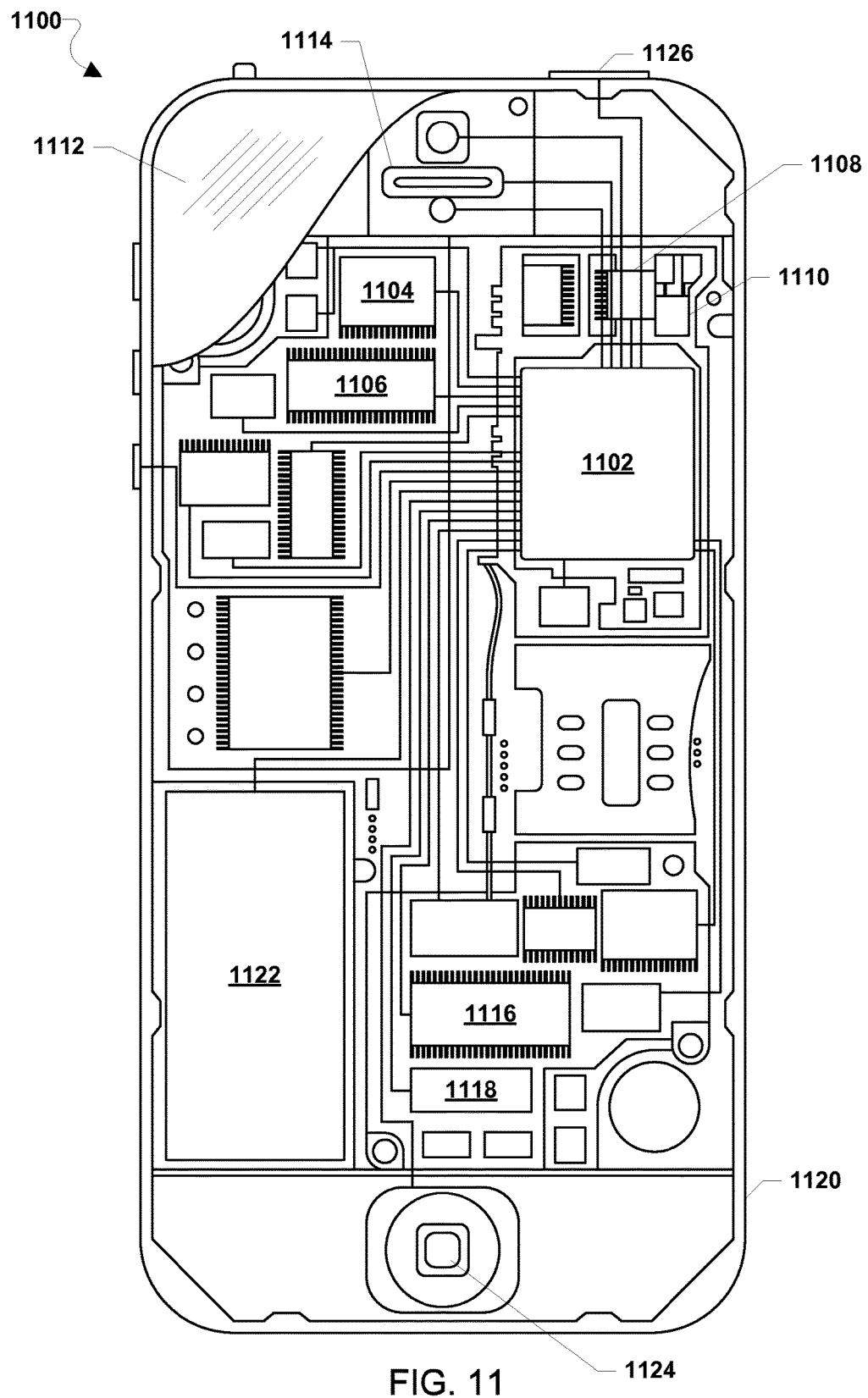
FIG. 11 is a component diagram of an example receiver device suitable for use with the various embodiments.

The various aspects may be implemented in any of a variety of mobile computing devices, an example of which is illustrated in FIG. 11. The mobile computing device 1100 may include a processor 1102 coupled to a touchscreen controller 1104 and an internal memory 1106. The processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the mobile computing device 1100 need not have touch screen capability.

The mobile computing device 1100 may have one or more radio signal transceivers 1108 (e.g., Peanut, Bluetooth, Zigbee, Wi-Fi, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile computing device 1100 may include a cellular network wireless modem chip 1116 that enables communication via a cellular network and is coupled to the processor.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

The mobile computing device 1100 may also include speakers 1114 for providing audio outputs. The mobile computing device 1100 may also include a housing 1120, constructed of a plastic, metal, or a combination of materials, for containing all or some of the components discussed herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of determining on a receiver device whether to cancel an ongoing download of a current segment of content at a current representation and to switch to another representation of the current segment in response to recognizing a switching situation, comprising:
   selecting another representation of the current segment in response to recognizing the switching situation during the ongoing download of the current segment at the current representation, wherein the switching situation comprises a change in operation or resources of the receiver device that affects one or more performance objectives of the receiver device;
   determining a cost of switching from the current segment at the current representation to the current segment at the selected representation, wherein the cost of switching comprises at least one of time or receiver device resources that are consumed in order to switch to the current segment at the selected representation, wherein determining the cost of switching from the current representation of the current segment to the selected representation of the current segment comprises:
      determining a cost of cancelling the ongoing download of the current segment at the current representation;
      determining a cost of re-downloading the current segment at the selected representation; and
      calculating a total cost based on the cost of cancelling the ongoing download of the current segment at the current representation and the cost of re-downloading the current segment at the selected representation;
   determining whether the cost of switching from the current segment at the current representation to the current segment at the selected representation exceeds a cost threshold based on the switching situation;
   cancelling the ongoing download of the current segment at the current representation and re-downloading the current segment at the selected representation in response to determining that the cost of switching does not exceed the cost threshold; and
   continuing the ongoing download of the current segment at the current representation in response to determining that the cost of switching exceeds the cost threshold.

2. The method of claim 1, further comprising recognizing when a pending playout stall will occur during the ongoing download of the current segment at the current representation, wherein:
   the cost threshold based on the switching situation comprises a time cost threshold based on the pending playout stall;
   the cost of cancelling the ongoing download of the current segment at the current representation comprises a time cost of cancelling the ongoing download of the current segment at the current representation;
   the cost of re-downloading the current segment at the selected representation comprises a time cost of re-downloading the current segment at the selected representation; and
   the total cost is a total time cost based on a sum of the time cost of re-downloading the current segment at the selected representation and the time cost of cancelling the ongoing download of the current segment at the current representation.

3. The method of claim 1, further comprising:
   determining a plurality of cost thresholds based on the switching situation;
   selecting a cost threshold in the plurality of cost thresholds that has not been previously selected;
   determining a cost of switching from the current segment at the current representation to the current segment at the selected representation based on the selected cost threshold;
   determining whether the cost of switching from the current segment at the current representation to the current segment at the selected representation exceeds the selected cost threshold;
   determining whether each of the plurality of cost thresholds has been evaluated for the current segment at the selected representation in response to determining that the cost of switching to the current segment at the selected representation does not exceed the selected cost threshold;
   selecting a cost threshold in the plurality of cost thresholds that has not been previously selected in response to determining that each of the plurality of cost thresholds has not been evaluated for the current segment at the selected representation; and
   cancelling the ongoing download of the current segment at the current representation and re-downloading the current segment at the selected representation in response to determining that each of the plurality of cost thresholds has been evaluated for the current segment at the selected representation.

4. The method of claim 1, further comprising:
generating an ordered list of representations available for the current segment in descending order for each representation with a bit rate lower than the current representation, wherein selecting another representation of the current segment comprises selecting a representation that is next in the ordered list of representations;
determining whether each representation in the ordered list of representations has been selected in response to determining that the cost of switching to the selected representation exceeds the cost threshold; and
performing one of:
selecting a representation that is next in the ordered list of representations in response to determining that each representation in the ordered list of representations has not been selected; or
continuing the ongoing download in response to determining that each representation in the ordered list of representations has been selected.

5. The method of claim 1, further comprising:
recognizing the switching situation characterized by an increase in resources available to the receiver device during the ongoing download of the current segment at the current representation;
generating an ordered list of representations available for the current segment in descending order for each representation with a bit rate higher than the current representation, wherein selecting another representation of the current segment comprises selecting a representation that is next in the ordered list of representations;
determining whether each representation in the ordered list of representations has been selected in response to determining that the cost of switching to the selected representation exceeds the cost threshold; and
selecting a representation that is next in the ordered list of representations in response to determining that each representation in the ordered list of representations has not been selected,
wherein continuing the ongoing download in response to determining that the cost of switching exceeds the cost threshold comprises continuing the ongoing download in response to determining that each representation in the ordered list of representations has been selected.

6. The method of claim 1, further comprising
recognizing the switching situation characterized by a sudden increase in bandwidth during the ongoing download of the current segment at the current representation, wherein:
determining a cost of switching to the selected representation comprises determining a cost of simultaneously downloading the current segment at the current representation and at the selected representation; and
determining whether the cost of switching to the selected representation exceeds a cost threshold comprises-determining whether the cost of simultaneously downloading the current segment exceeds the cost threshold; and
performing one of:
continuing the ongoing download in response to determining that the cost of simultaneously downloading the current segment exceeds the cost threshold; or
initiating download of the selected representation while continuing the ongoing download and switching playout of the current segment to the selected representation while simultaneously downloading the current segment at the current representation in response to determining that the cost of simultaneously downloading the current segment does not exceed the cost threshold.

7. A receiver device, comprising:
a memory; and
a processor coupled to the memory and configured with processor-executable instructions to perform operations comprising:
selecting another representation of a current segment of content in response to recognizing a switching situation during an ongoing download of the current segment at a current representation, wherein the switching situation comprises a change in operation or resources of the receiver device that affects one or more performance objectives of the receiver device;
determining a cost of switching from the current segment at the current representation to the selected representation, wherein the cost of switching comprises at least one of time or receiver device resources that are consumed in order to switch to the current segment at the selected representation, wherein determining the cost of switching from the current representation of the current segment to the selected representation of the current segment comprises:
determining a cost of cancelling the ongoing download of the current segment at the current representation;
determining a cost of re-downloading the current segment at the selected representation; and
calculating a total cost based on the cost of the cost of cancelling the ongoing download of the current segment at the current representation and the cost of re-downloading the current segment at the selected representation of the current segment;
determining whether the cost of switching from the current segment at the current representation to the current segment at the selected representation exceeds a cost threshold based on the switching situation;
cancelling an ongoing download of the current segment at the current representation and re-downloading the current segment at the selected representation in response to determining that the cost of switching does not exceed the cost threshold; and
continuing the ongoing download of the current segment at the current representation in response to determining that the cost of switching exceeds the cost threshold.

8. The receiver device of claim 7, wherein the processor is configured with processor-executable instructions to perform operations further comprising:
recognizing when a pending playout stall will occur during the ongoing download of the current segment at the current representation; and wherein:
the cost threshold based on the switching situation comprises a time cost threshold based on the pending playout stall;
the cost of cancelling the ongoing download of the current segment at the current representation comprises a time cost of cancelling the ongoing download of the current segment at the current representation;
the cost of re-downloading the current segment at the selected representation comprises a time cost of re-downloading the current segment at the selected representation; and
the total cost is a total time cost based on a sum of the time cost of re-downloading the current segment at the selected representation and the time cost of cancelling the ongoing download of the current segment at the current representation.

9. The receiver device of claim 7, wherein the processor is configured with processor-executable instructions to perform operations further comprising:
determining a plurality of cost thresholds based on the switching situation;
selecting a cost threshold in the plurality of cost thresholds that has not been previously selected;
determining a cost of switching from the current segment at the current representation to the current segment at the selected representation based on the selected cost threshold;
determining whether the cost of switching from the current segment at the current representation to the selected representation of the current segment exceeds the selected cost threshold;
determining whether each of the plurality of cost thresholds has been evaluated for the current segment at the selected representation in response to determining that the cost of switching to the current segment at the selected representation does not exceed the selected cost threshold;
selecting a cost threshold in the plurality of cost thresholds that has not been previously selected in response to determining that each of the plurality of cost thresholds has not been evaluated for the current segment at the selected representation; and
cancelling the ongoing download of the current segment at the current representation and re-downloading the current segment at the selected representation in response to determining that each of the plurality of cost thresholds has been evaluated for the current segment at the selected representation.

10. The receiver device of claim 7, wherein the processor is configured with processor-executable instructions to perform operations further comprising:
generating an ordered list of representations available for the current segment in descending order for each representation with a bit rate lower than the current representation, wherein the processor is configured with processor-executable instructions to perform operations such that selecting another representation of the current segment comprises selecting a representation that is next in the ordered list of representations;
determining whether each representation in the ordered list of representations has been selected in response to determining that the cost of switching to the selected representation exceeds the cost threshold;
selecting a representation that is next in the ordered list of representations in response to determining that each representation in the ordered list of representations has not been selected; and
continuing the ongoing download in response to determining that each representation in the ordered list of representations has been selected.

11. The receiver device of claim 7, wherein:
the processor is configured with processor-executable instructions to perform operations further comprising:
recognizing the switching situation characterized by an increase in resources available to the receiver device during the ongoing download of the current segment at the current representation;
generating an ordered list of representations available for the current segment in descending order for each representation with a bit rate higher than the current representation, wherein the processor is configured with processor-executable instructions to perform operations such that selecting another representation of the current segment comprises selecting a representation that is next in the ordered list of representations;
determining whether each representation in the ordered list of representations has been selected in response to determining that the cost of switching to the selected representation exceeds the cost threshold; and
selecting a representation that is next in the ordered list of representations in response to determining that each representation in the ordered list of representations has not been selected; and
the processor is configured with processor-executable instructions to perform operations such that continuing the ongoing download in response to determining that the cost of switching exceeds the cost threshold comprises continuing the ongoing download in response to determining that each representation in the ordered list of representations has been selected.

12. The receiver device of claim 7, wherein:
the processor is configured with processor-executable instructions to perform operations further comprising recognizing the switching situation characterized by a sudden increase in bandwidth during the ongoing download of the current segment at the current representation;
the processor is configured with processor-executable instructions to perform operations such that:
determining a cost of switching to the selected representation comprises determining a cost of simultaneously downloading the current segment at the current representation and at the selected representation; and
determining whether the cost of switching to the selected representation exceeds a cost threshold comprises determining whether the cost of simultaneously downloading the current segment exceeds the cost threshold; and
the processor is configured with processor-executable instructions to perform operations further comprising:
continuing the ongoing download in response to determining that the cost of simultaneously downloading the current segment exceeds the cost threshold;
initiating download of the selected representation while continuing the ongoing download in response to determining that the cost of simultaneously downloading the current segment does not exceed the cost threshold; and
switching playout of the current segment to the selected representation while simultaneously downloading the current segment at the current representation and at the selected representation.

13. A receiver device, comprising:
means for selecting another representation of a current segment of content in response to recognizing a switching situation during an ongoing download of the current segment at a current representation, wherein the switching situation comprises a change in operation or resources of the receiver device that affects one or more performance objectives of the receiver device;
means for determining a cost of switching from the current segment at the current representation to the current segment at the selected representation, wherein the cost of switching comprises at least one of time or receiver device resources that are consumed in order to switch to the current segment at the selected representation, wherein means for determining the cost of switching from the current representation of the current segment to the selected representation of the current segment comprises:
  means for determining a cost of cancelling the ongoing download of the current segment at the current representation;
  means for determining a cost of re-downloading the current segment at the selected representation; and
  means for calculating a total cost based on the cost of cancelling the ongoing download of current segment at the current representation and the cost of re-downloading the current segment at the selected representation;
means for determining whether the cost of switching from the current segment at the current representation to the current segment at the selected representation exceeds a cost threshold based on the switching situation;
means for cancelling the ongoing download of the current segment at the current representation and re-downloading the current segment at the selected representation in response to determining that the cost of switching does not exceed the cost threshold; and
means for continuing the ongoing download of the current segment at the current representation in response to determining that the cost of switching exceeds the cost threshold.

14. The receiver device of claim 13, further comprising means for recognizing when a pending playout stall will occur during the ongoing download of the current segment at the current representation, wherein:
  the cost threshold based on the switching situation comprises a time cost threshold based on the pending playout stall;
    the cost of cancelling the ongoing download of the current segment at the current representation comprises a time cost of cancelling the ongoing download of the current segment at the current representation;
    the cost of re-downloading the current segment at the selected representation comprises a time cost of re-downloading the current segment at the selected representation; and
    the total cost is a total time cost based on a sum of the time cost of re-downloading the current segment at the selected representation and the time cost of cancelling the ongoing download of the current segment at the current representation.

15. The receiver device of claim 13, further comprising:
means for determining a plurality of cost thresholds based on the switching situation;
means for selecting a cost threshold in the plurality of cost thresholds that has not been previously selected;
means for determining a cost of switching from the current segment at the current representation to the current segment at the selected representation based on the selected cost threshold;
means for determining whether the cost of switching from the current segment at the current representation to the current segment at the selected representation exceeds the selected cost threshold;
means for determining whether each of the plurality of cost thresholds has been evaluated for the current segment at the selected representation in response to determining that the cost of switching to the current segment at the selected representation does not exceed the selected cost threshold;
means for selecting a cost threshold in the plurality of cost thresholds that has not been previously selected in response to determining that each of the plurality of cost thresholds has not been evaluated for the current segment at the selected representation; and
means for cancelling the ongoing download of the current segment at the current representation and re-downloading the current segment at the selected representation in response to determining that each of the plurality of cost thresholds has been evaluated for the current segment at the selected representation.

16. The receiver device of claim 13, further comprising:
means for generating an ordered list of representations available for the current segment in descending order for each representation with a bit rate lower than the current representation, wherein means for selecting another representation of the current segment comprises means for selecting a representation that is next in the ordered list of representations;
means for determining whether each representation in the ordered list of representations has been selected in response to determining that the cost of switching to the selected representation exceeds the cost threshold;
means for selecting a representation that is next in the ordered list of representations in response to determining that each representation in the ordered list of representations has not been selected; and
means for continuing the ongoing download in response to determining that each representation in the ordered list of representations has been selected.

17. The receiver device of claim 13, further comprising:
means for recognizing the switching situation characterized by an increase in resources available to the receiver device during the ongoing download of the current segment at the current representation;
means for generating an ordered list of representations available for the current segment in descending order for each representation with a bit rate higher than the current representation, wherein means for selecting another representation of the current segment comprises means for selecting a representation that is next in the ordered list of representations;
means for determining whether each representation in the ordered list of representations has been selected in response to determining that the cost of switching to the selected representation exceeds the cost threshold; and
means for selecting a representation that is next in the ordered list of representations in response to determining that each representation in the ordered list of representations has not been selected,
wherein means for continuing the ongoing download in response to determining that the cost of switching exceeds the cost threshold comprises means for continuing the ongoing download in response to determining that each representation in the ordered list of representations has been selected.

18. The receiver device of claim 13, further comprising:
means for recognizing the switching situation characterized by a sudden increase in bandwidth during the ongoing download of the current segment at the current representation, wherein:
  means for determining a cost of switching to the selected representation comprises means for determining a cost of simultaneously downloading the current segment at the current representation and at the selected representation; and
  means for determining whether the cost of switching to the selected representation exceeds a cost threshold comprises means for determining whether the cost of simultaneously downloading the current segment exceeds the cost threshold;
means for continuing the ongoing download in response to determining that the cost of simultaneously downloading the current segment exceeds the cost threshold;
means for initiating download of the selected representation while continuing the ongoing download and switching playout of the current segment to the selected representation while simultaneously downloading the current segment at the current representation in response to determining that the cost of simultaneously downloading the current segment does not exceed the cost threshold.

19. A non-transitory processor-readable storage medium having stored thereon processor-executable instructions configured to cause a receiver device processor to perform operations comprising:
  selecting another representation of a current segment of content in response to recognizing a switching situation during an ongoing download of the current segment at a current representation, wherein the switching situation comprises a change in operation or resources of the receiver device that affects one or more performance objectives of the receiver device;
  determining a cost of switching from the current segment at the current representation to the current segment at the selected representation, wherein the cost of switching comprises at least one of time or receiver device resources that are consumed in order to switch to the current segment at the selected representation, wherein determining the cost of switching from the current representation of the current segment to the selected representation of the current segment comprises:
    determining a cost of cancelling the ongoing download of the current segment at the current representation;
    determining a cost of re-downloading the current segment at the selected representation; and
    calculating a total cost based on the cost of cancelling the ongoing download of the current segment at the current representation and the cost of re-downloading the current segment at the selected representation;
  determining whether the cost of switching from the current segment at the current representation to the current segment at the selected representation exceeds a cost threshold based on the switching situation;
  cancelling the ongoing download of the current segment at the current representation and re-downloading the current segment at the selected representation in response to determining that the cost of switching does not exceed the cost threshold; and
  continuing the ongoing download of the current segment at the current representation in response to determining that the cost of switching exceeds the cost threshold.

20. The non-transitory processor-readable storage medium of claim 19, wherein the stored processor-executable instructions are configured to cause the receiver device processor to perform operations further comprising:
  recognizing when a pending playout stall will occur during the ongoing download of the current segment at the current representation; and
  wherein:
    the cost threshold based on the switching situation comprises a time cost threshold based on the pending playout stall;
    the cost of cancelling the ongoing download of the current segment at the current representation comprises a time cost of cancelling the ongoing download of the current segment at the current representation;
    the cost of re-downloading the current segment at the selected representation comprises a time cost of re-downloading the current segment at the selected representation; and
    the total cost is a total time cost based on a sum of the time cost of re-downloading the current segment at the selected representation and the time cost of cancelling the ongoing download of the current segment at the current representation.

21. The non-transitory processor-readable storage medium of claim 19, wherein the stored processor-executable instructions are configured to cause the receiver device processor to perform operations further comprising:
  determining a plurality of cost thresholds based on the switching situation;
  selecting a cost threshold in the plurality of cost thresholds that has not been previously selected;
  determining a cost of switching from the current segment at the current representation to the current segment at the selected representation based on the selected cost threshold;
  determining whether the cost of switching from the current segment at the current representation to the current segment at the selected representation exceeds the selected cost threshold;
  determining whether each of the plurality of cost thresholds has been evaluated for the current segment at the selected representation in response to determining that the cost of switching to the current segment at the selected representation does not exceed the selected cost threshold;
  selecting a cost threshold in the plurality of cost thresholds that has not been previously selected in response to determining that each of the plurality of cost thresholds has not been evaluated for the current segment at the selected representation; and
  cancelling the ongoing download of the current segment at the current representation and re-downloading the current segment at the selected representation in response to determining that each of the plurality of cost thresholds has been evaluated for the current segment at the selected representation.

22. The non-transitory processor-readable storage medium of claim 19, wherein the stored processor-executable instructions are configured to cause a receiver device processor to perform operations further comprising:
  generating an ordered list of representations available for the current segment in descending order for each representation with a bit rate lower than the current representation, wherein the stored processor-executable instructions are configured to cause a receiver device processor to perform operations such that selecting another representation of the current segment comprises selecting a representation that is next in the ordered list of representations;

determining whether each representation in the ordered list of representations has been selected in response to determining that the cost of switching to the selected representation exceeds the cost threshold;

selecting a representation that is next in the ordered list of representations in response to determining that each representation in the ordered list of representations has not been selected; and continuing the ongoing download in response to determining that each representation in the ordered list of representations has been selected.

23. The non-transitory processor-readable storage medium of claim 19, wherein:

the stored processor-executable instructions are configured to cause a receiver device processor to perform operations further comprising:

recognizing the switching situation characterized by an increase in resources available to a receiver device during the ongoing download of the current segment at the current representation;

generating an ordered list of representations available for the current segment in descending order for each representation with a bit rate higher than the current representation, wherein the stored processor-executable instructions are configured to cause a receiver device processor to perform operations such that selecting another representation of the current segment comprises selecting a representation that is next in the ordered list of representations;

determining whether each representation in the ordered list of representations has been selected in response to determining that the cost of switching to the selected representation exceeds the cost threshold; and selecting a representation that is next in the ordered list of representations in response to determining that each representation in the ordered list of representations has not been selected; and the stored processor-executable instructions are configured to cause a receiver device processor to perform operations such that continuing the ongoing download in response to determining that the cost of switching exceeds the cost threshold comprises continuing the ongoing download in response to determining that each representation in the ordered list of representations has been selected.

24. The non-transitory processor-readable storage medium of claim 19, wherein:

the stored processor-executable instructions are configured to cause a receiver device processor to perform operations further comprising further comprising recognizing the switching situation characterized by a sudden increase in bandwidth during the ongoing download of the current segment at the current representation;

the stored processor-executable instructions are configured to cause a receiver device processor to perform operations such that:

determining a cost of switching to the selected representation comprises determining a cost of simultaneously downloading the current segment at the current representation and at the selected representation; and determining whether the cost of switching to the selected representation exceeds a cost threshold comprises determining whether the cost of simultaneously downloading the current segment exceeds the cost threshold; and the stored processor-executable instructions are configured to cause a receiver device processor to perform operations further comprising:

continuing the ongoing download in response to determining that the cost of simultaneously downloading the current segment exceeds the cost threshold;

initiating download of the selected representation while continuing the ongoing download switching playout of the current segment to the selected representation while simultaneously downloading the current segment at the current representation in response to determining that the cost of simultaneously downloading the current segment does not exceed the cost threshold.

* * * * *